US012759498B2

(12) United States Patent
Yonezawa et al.

(10) Patent No.: US 12,759,498 B2
(45) Date of Patent: Oct. 13, 2026

(54) GAS GENERATOR AND METHOD FOR PRODUCING GAS GENERATOR

(71) Applicant: DAICEL CORPORATION, Osaka (JP)

(72) Inventors: Kenichi Yonezawa, Tokyo (JP); Naoki Matsuda, Tokyo (JP); Toshihiro Izuma, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 19/002,769

(22) Filed: Dec. 27, 2024

(65) Prior Publication Data

US 2025/0145104 A1 May 8, 2025

Related U.S. Application Data

(63) Continuation of application No. PCT/JP2023/003071, filed on Jan. 31, 2023.

(30) Foreign Application Priority Data

Jun. 28, 2022 (JP) ................................ 2022-103652

(51) Int. Cl.
*B60R 21/264* (2006.01)
*B60R 21/26* (2011.01)

(52) U.S. Cl.
CPC . *B60R 21/2644* (2013.01); *B60R 2021/26011* (2013.01); *B60R 2021/2648* (2013.01)

(58) Field of Classification Search
CPC . B60R 21/261; B60R 21/264; B60R 21/2644; B60R 21/274; B60R 21/276;
(Continued)

(56) References Cited

U.S. PATENT DOCUMENTS 5,806,885 A * 9/1998 Hock .................... B60R 21/264 280/741
6,170,869 B1 * 1/2001 Tomiyama .......... B60R 21/2644 280/741
(Continued)

FOREIGN PATENT DOCUMENTS

DE 102017128886 A1 6/2019
DE 102019131394 A1 5/2021
(Continued)

OTHER PUBLICATIONS

International Search Report and Written Opinion mailed on Apr. 18, 2023, received for PCT Application PCT/JP2023/003071, filed on Jan. 31, 2023, 11 pages including English Translation.
(Continued)

*Primary Examiner* — Troy Chambers
*Assistant Examiner* — Benjamin S Gomberg
(74) *Attorney, Agent, or Firm* — XSENSUS LLP

(57) ABSTRACT

A gas generator includes a plurality of gas discharge ports with a first gas discharge port and a second gas discharge port, the first gas discharge port and the second gas discharge port being configured such that rupturing pressures of a closing member at the first gas discharge port and the second gas discharge port are different from each other, a minimum flow path cross-sectional area of a gas flow path formed by the first gas discharge port is equivalent to a minimum flow path cross-sectional area of a gas flow path formed by the second gas discharge port, and the first gas discharge port and the second gas discharge port are different from each other in at least one of a shape or a peripheral length of an opening on an inner surface side of a housing.

19 Claims, 15 Drawing Sheets

(58) Field of Classification Search
CPC . B60R 2021/26011; B60R 2021/26029; B60R 2021/26094; B60R 2021/2612; B60R 2021/2642; B60R 2021/2648; B60R 2021/2765; F42B 3/04; F42B 3/045; F42B 3/10
USPC .......................................................... 102/530
See application file for complete search history.

(56) References Cited

U.S. PATENT DOCUMENTS

| | | | | |
|---|---|---|---|---|
| 6,206,417 | B1 * | 3/2001 | Soderquist | B60R 21/261 280/736 |
| 6,324,760 | B1 | 12/2001 | Tomiyama | |
| 6,722,694 | B1 * | 4/2004 | Nakashima | B01D 46/4218 280/736 |
| 6,846,014 | B2 * | 1/2005 | Rink | B60R 21/2644 280/736 |
| 7,578,522 | B2 * | 8/2009 | Hanano | B60R 21/2644 280/736 |
| 8,469,398 | B2 * | 6/2013 | Numoto | B60R 21/264 280/736 |
| 10,730,474 | B2 * | 8/2020 | Takizawa | B60R 21/2644 |
| 2003/0146611 | A1 * | 8/2003 | Kenney | B60R 21/2644 280/736 |
| 2003/0160437 | A1 * | 8/2003 | Ohji | B60R 21/2644 280/736 |
| 2003/0173761 | A1 | 9/2003 | Rink et al. | |
| 2007/0039508 | A1 * | 2/2007 | Saito | B60R 21/2644 102/530 |
| 2008/0143088 | A1 * | 6/2008 | Yamazaki | B60R 21/2644 280/739 |
| 2009/0115175 | A1 * | 5/2009 | Nishimura | B60R 21/2644 280/741 |
| 2010/0269727 | A1 * | 10/2010 | Katsuda | B60R 21/2644 102/530 |
| 2013/0200600 | A1 * | 8/2013 | Bierwirth | B60R 21/261 280/740 |
| 2017/0043742 | A1 * | 2/2017 | Ueda | B60R 21/264 |
| 2018/0312132 | A1 * | 11/2018 | Ohsugi | B60R 21/2644 |
| 2021/0046896 | A1 | 2/2021 | Hirooka et al. | |
| 2025/0076008 | A1 * | 3/2025 | Yonezawa | B60R 21/2644 |
| 2025/0145105 | A1 * | 5/2025 | Miyamoto | B60R 21/2644 |

FOREIGN PATENT DOCUMENTS

| | | | |
|---|---|---|---|
| DE | 102019134899 | A1 | 6/2021 |
| JP | H10217899 | A | 8/1998 |
| JP | 2013241102 | A | 12/2013 |
| JP | 2019156107 | A | 9/2019 |
| JP | 2021079950 | A | 5/2021 |
| WO | 2009014915 | A1 | 1/2009 |

OTHER PUBLICATIONS

International Search Report and Written Opinion mailed on Sep. 5, 2023, received for PCT Application PCT/JP2023/024003, filed on Jun. 28, 2023, 11 pages including English Translation.

U.S. Appl. No. 19/003,120, filed Dec. 27, 2024, US2025/0145105A1, Daicel Corporation.

* cited by examiner

GAS GENERATOR AND METHOD FOR PRODUCING GAS GENERATOR

CROSS-REFERENCE TO RELATED APPLICATIONS

The present application is a Continuation of International Patent Application No. PCT/JP2023/003071 filed on Jan. 31, 2023, which contains subject matter related to Japanese Patent Application No. 2022-103652 filed in the Japan Patent Office on Jun. 28, 2022, the entire contents of each are incorporated herein by reference.

TECHNICAL FIELD

The present invention relates to a gas generator and a method for producing a gas generator.

BACKGROUND ART

Typically, a gas generator is widely used in which an igniter and a gas generating agent are disposed in a housing, the gas generating agent is combusted by activating the igniter, and the combustion gas is discharged to the outside from a plurality of gas discharge ports formed in the housing.

The gas generator is configured in a manner that the inside of the housing is maintained airtight before actuation by closing the plurality of gas discharge ports with a closing member such as a seal tape, and after actuation, the closing member is ruptured by a pressure of the combustion gas to open the gas discharge ports. In relation to this, there is known a technique in which a gas discharge port is formed in a manner that a protrusion (burr) is formed around the gas discharge port on an inner wall surface side of the housing and a range including the gas discharge port and the protrusion is covered with a seal tape so that the closing member is reliably ruptured in actuation of the gas generator to stabilize output performance (for example, Patent Document 1).

CITATION LIST

Patent Document

Patent Document 1: JP 2013-241102 A

SUMMARY OF INVENTION

Technical Problem

Now, the output performance of the gas generator is defined by using a discharge amount and a discharge time of the combustion gas as parameters. In this case, to obtain stable (reproducible) output performance, it is important to ensure stable combustion of a gas generating agent.

An object of the technique of the present disclosure is to provide a gas generator having stable output performance.

Solution to Problem

To solve the above problem, the technique of the present disclosure adopts the following configuration. That is, the technique according to an embodiment of the present disclosure is a gas generator. A gas generator according to an embodiment of the present disclosure includes an igniter, a gas generating agent that generates a combustion gas by being combusted in response to actuation of the igniter, a housing accommodating the igniter and the gas generating agent inside the housing, a plurality of gas discharge ports penetrating through the housing from an inside to an outside of the housing, and a closing member attached to an inner surface of the housing, the closing member being configured to close, before the actuation of the igniter, the plurality of gas discharge ports by covering an opening of each of the plurality of gas discharge ports on an inner surface side of the housing and open the plurality of gas discharge ports by being ruptured due to reception of a pressure of the combustion gas generated by the actuation of the igniter. The plurality of gas discharge ports include at least one first gas discharge port and at least one second gas discharge port, the at least one first gas discharge port and the at least one second gas discharge port being configured such that rupturing pressures of the closing member at the at least one first gas discharge port and the at least one second gas discharge port are different from each other, a minimum flow path cross-sectional area of a gas flow path formed by the at least one first gas discharge port is equivalent to a minimum flow path cross-sectional area of a gas flow path formed by the at least one second gas discharge port, and the at least one first gas discharge port and the at least one second gas discharge port are different from each other in at least one of a shape or a peripheral length of an opening on the inner surface side of the housing.

According to the gas generator of the embodiment of the present disclosure, the minimum flow path cross-sectional areas of the first gas discharge port and the second gas discharge port that control gas discharge amounts are made equivalent to each other, which causes a gas discharge amount per unit time of the first gas discharge port and a gas discharge amount per unit time of the second gas discharge port to be equivalent to each other. Further, at least either of the shape or the peripheral length of the opening on the inner surface side of the housing is made different between the first gas discharge port and the second gas discharge port, causing the rupturing pressure at the first gas discharge port and the rupturing pressure at the second gas discharge port to be different from each other. In other words, it is possible to intentionally set two types of gas discharge ports having internal pressure control functions for the housing equivalent to each other and different ease of opening. According to this configuration, an opening timing of the first gas discharge port and an opening timing of the second gas discharge port are made different from each other, and thus a rapid internal pressure drop of the housing can be suppressed when the igniter is activated. As a result, combustion performance of the gas generating agent can be maintained and output performance of the gas generator can be stabilized.

In addition, in the gas generator according to an embodiment of the present disclosure, the at least one first gas discharge port and the at least one second gas discharge port may be closed with the closing members having specifications identical to each other.

In addition, in the gas generator according to an embodiment of the present disclosure, each of the at least one first gas discharge port and the at least one second gas discharge port may be a port having a circular cross section, and the at least one first gas discharge port and the at least one second gas discharge port may be different from each other in a port diameter of the opening on the inner surface side of the housing.

Further, in the gas generator according to an embodiment of the present disclosure, each of the at least one first gas discharge port and the at least one second gas discharge port may include a straight portion having a constant cross section in a thickness direction of the housing and a tapered portion continuous with the straight portion and having a cross-sectional area increasing with distance from the straight portion in the thickness direction, in one of the at least one first gas discharge port and the at least one second gas discharge port, the tapered portion may open on the inner surface side of the housing and the straight portion may open on an outer surface side of the housing, and in the other of the at least one first gas discharge port and the at least one second gas discharge port, the straight portion may open on the inner surface side of the housing and the tapered portion may open on the outer surface side of the housing.

Further, in the gas generator according to an embodiment of the present disclosure, the straight portion may be constituted by a shear surface, and the tapered portion may be constituted by a fracture surface.

In addition, in the gas generator according to an embodiment of the present disclosure, a relationship of $0.3<t2/t1<0.7$ may be satisfied where a thickness of the housing is denoted by t1 and a length of the straight portion in the thickness direction of the housing is denoted by t2.

Further, in the gas generator according to an embodiment of the present disclosure, a protruding portion protruding toward the inner side of the housing may be formed at least a part of a peripheral edge of an opening on the inner surface side of the housing of only one of the at least one first gas discharge port and the at least one second gas discharge port, and the closing member may be attached to the inner surface of the housing while covering the protruding portion.

In addition, in the gas generator according to an embodiment of the present disclosure, a peripheral edge of an opening on the inner surface side of the housing of only one of the at least one first gas discharge port and the at least one second gas discharge port may be chamfered.

Moreover, the technique according to an embodiment of the present disclosure can also be specified as a method for producing a gas generator. That is, the technique according to an embodiment of the present disclosure is a method for producing a gas generator including an igniter, a gas generating agent that generates a combustion gas by being combusted in response to actuation of the igniter, a housing accommodating the igniter and the gas generating agent inside the housing, a plurality of gas discharge ports penetrating through the housing from an inside to an outside of the housing, and a closing member configured to close the plurality of gas discharge ports, the method including forming the plurality of gas discharge ports including at least one first gas discharge port and at least one second gas discharge port in the housing in such a manner that rupturing pressures of the closing member at the at least one first gas discharge port and the at least one second gas discharge port are different from each other, and attaching the closing member to an inner surface of the housing in such a manner that the closing member covers an opening of each of the plurality of gas discharge ports on the inner surface side of the housing. In the forming the plurality of gas discharge ports in the housing, a minimum flow path cross-sectional area of a gas flow path formed by the at least one first gas discharge port and a minimum flow path cross-sectional area of a gas flow path formed by the at least one second gas discharge port are equivalent to each other, and the at least one first gas discharge port and the at least one second gas discharge port are different from each other in at least one of a shape or a peripheral length of an opening on the inner surface side of the housing.

Further, in the method for producing a gas generator according to an embodiment of the present disclosure, in the forming the plurality of gas discharge ports in the housing, one of the at least one first gas discharge port and the at least one second gas discharge port may be formed by punching a hole from an outer surface side of the housing, and the other of the at least one first gas discharge port and the at least one second gas discharge port may be formed by punching a hole from the inner surface side of the housing.

In addition, in the method for producing a gas generator according to an embodiment of the present disclosure, in the forming the plurality of gas discharge ports in the housing, chamfering may be performed on an opening on the inner surface side of the housing of only one of the at least one first gas discharge port and the at least one second gas discharge port.

Further, in the method for producing a gas generator according to the present disclosure, in the attaching the closing member to the inner surface of the housing, the at least one first gas discharge port and the at least one second gas discharge port may be closed with the closing members having specifications identical to each other.

Advantageous Effects of Invention

According to the technique of the present disclosure, a gas generator with stable output performance can be provided.

DESCRIPTION OF EMBODIMENTS

A gas generator according to an embodiment of the present disclosure will be described below with reference to the drawings. In the following embodiment, an aspect where a technique according to an embodiment of the present disclosure is applied to a gas generator for an airbag (inflater) will be described. However, the application of the technique according to the present disclosure is not limited thereto. For example, the technique may be applied to a gas generator for a seat belt retractor. The configurations, combinations thereof, and the like in each embodiment are an example, and various additions, omissions, substitutions, and other changes may be made as appropriate without departing from the spirit of the present invention. The present disclosure is not limited by the embodiments, but only limited by the claims.

Embodiment 1

Hereinafter, Embodiment 1 will be described. Embodiment 1 corresponds to an aspect in which the peripheral length of the opening of the first gas discharge port on the inner surface side of the housing and the peripheral length of the opening of the second gas discharge port on the inner surface side of the housing are different from each other among aspects to which the technique according to the present disclosure can be adopted.

Figure 1:
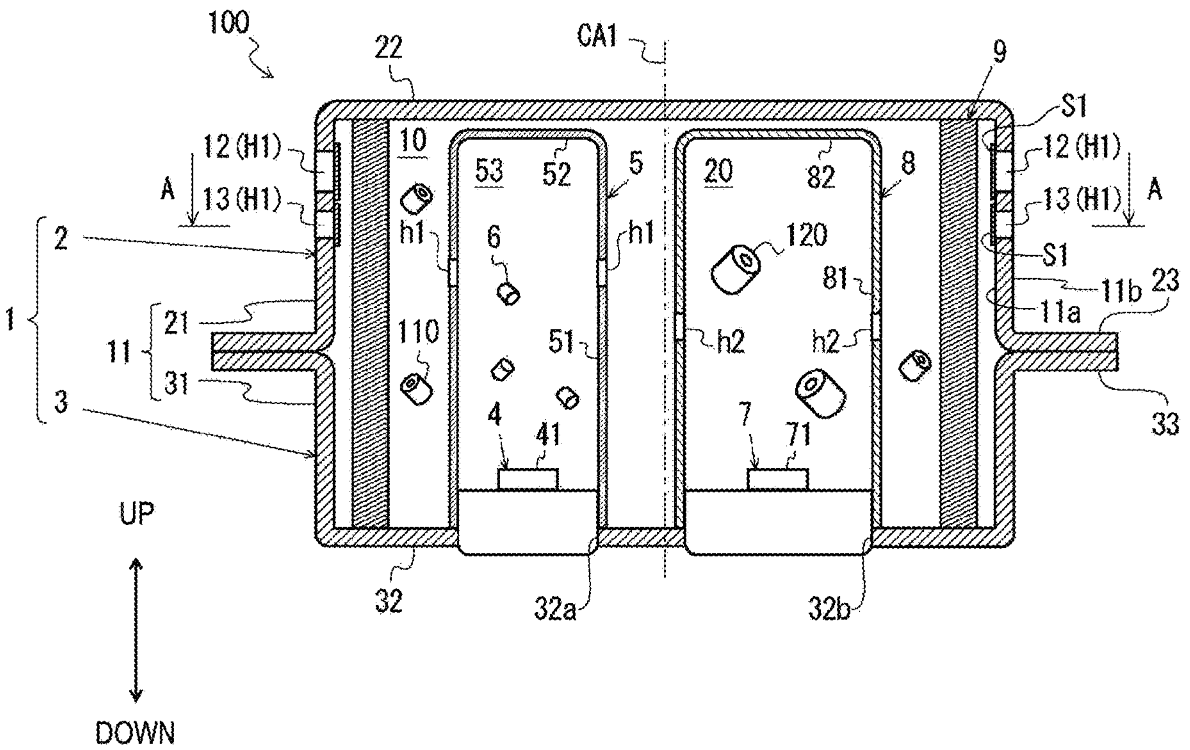
FIG. 1 is a longitudinal cross-sectional view illustrating a state of a gas generator before actuation according to Embodiment 1.

FIG. 1 is a longitudinal cross-sectional view illustrating a state of a gas generator 100 before actuation according to Embodiment 1. FIG. 1 illustrates a cross section along a center axis of a housing 1, and the center axis is indicated by a reference sign CA1. The gas generator 100 according to Embodiment 1 is configured as a so-called dual type gas generator including two igniters. However, the technique according to the present disclosure is not limited to such a configuration. In other words, the gas generator according to the present disclosure may be a single type gas generator provided with only one igniter, or may be a gas generator provided with three or more igniters. Overall Configuration As illustrated in FIG. 1, the gas generator 100 includes a first ignition device 4, a first inner tube member 5, a transfer charge 6, a second ignition device 7, a second inner tube member 8, a filter 9, a first gas generating agent 110, a second gas generating agent 120, the housing 1 that accommodates these constituent elements, a plurality of gas discharge ports H1 each of which penetrates through the housing 1 from the inside to the outside of the housing 1, and a seal tape S1 that seals the plurality of gas discharge ports H1. The gas generator 100 is also configured to activate a first igniter 41 included in the first ignition device 4 to combust the first gas generating agent 110, to activate a second igniter 71 included in the second ignition device 7 to combust the second gas generating agent 120, and to discharge a combustion gas, which is a combustion product of these gas generating agents, from the plurality of gas discharge ports H1 formed in the housing 1. Here, a direction along the center axis CA1 of the housing 1 is defined as a vertical direction of the gas generator 100, a side of an upper shell indicated by a reference sign 2 (that is, an upper side in FIG. 1) is defined as an upper side of the gas generator 100, and a side of a lower shell indicated by a reference sign 3 (that is, a lower side in FIG. 1) is defined as a lower side of the gas generator 100. Hereinafter, each configuration of the gas generator 100 will be described. Note that in the present specification, the activation of the igniter included in the ignition device may be expressed as "activation of the ignition device" or "activation of the gas generator" for convenience.

Housing

An upper shell 2 and a lower shell 3 each made of a metal and formed into a bottomed substantially cylindrical shape are joined in a state where respective open ends face each other. Thus, the housing 1 is formed in a short cylindrical shape including a tubular peripheral wall portion denoted by a reference sign 11 and in which both ends of the peripheral wall portion 11 in an axial direction are closed. The center axis CA1 in FIG. 1 is a center axis of the peripheral wall portion 11.

The upper shell 2 includes an upper peripheral wall portion 21 having a tubular shape and a top plate portion 22 that closes an upper end of the upper peripheral wall portion 21. A joining portion 23 extending radially outward is connected to a lower end portion of the upper peripheral wall portion 21. The lower shell 3 includes a lower peripheral wall portion 31 having a tubular shape and a bottom plate portion 32 that closes a lower end of the lower peripheral wall portion 31. A joining portion 33 extending radially outward is connected to an upper end portion of the lower peripheral wall portion 31. A first attachment hole 32*a* for attaching the first ignition device 4 to the bottom plate portion 32 and a second attachment hole 32*b* for attaching the second ignition device 7 to the bottom plate portion 32 are formed in the bottom plate portion 32.

The joining portion 23 of the upper shell 2 and the joining portion 33 of the lower shell 3 are overlapped and joined by laser welding or the like to form the housing 1 having a short cylindrical shape with both axial ends closed. The upper peripheral wall portion 21 of the upper shell 2 and the lower peripheral wall portion 31 of the lower shell 3 form the peripheral wall portion 11 that is tubular and connects the top plate portion 22 and the bottom plate portion 32. That is, the housing 1 includes the peripheral wall portion 11 that is tubular, the top plate portion 22 provided at one end of the peripheral wall portion 11, and the bottom plate portion 32 provided at the other end and facing the top plate portion 22. The peripheral wall portion 11, the top plate portion 22, the bottom plate portion 32, and the second inner tube member 8, which will be described below, define a first combustion chamber 10. The first ignition device 4, the first inner tube member 5, the transfer charge 6, the filter 9, and the first gas generating agent 110 are disposed in the first combustion chamber 10.

Ignition Device

As illustrated in FIG. 1, the first ignition device 4 is fixed in the first attachment hole 32*a* formed in the bottom plate portion 32 of the lower shell 3. The first ignition device 4 includes the first igniter 41. The second ignition device 7 is fixed in the second attachment hole 32*b* formed in the bottom plate portion 32 of the lower shell 3. The second ignition device 7 includes the second igniter 71. Each of the first igniter 41 and the second igniter 71 accommodates an ignition charge (not illustrated) therein and is activated by being supplied with an ignition current. Upon activation, the ignition charge is combusted, and a combustion product is discharged to the outside. Each of the first igniter 41 and the second igniter 71 is an example of the "igniter" according to the present disclosure. The first ignition device 4 and the second ignition device 7 are activated independently of each other. When activating the second ignition device 7, the second ignition device 7 is activated simultaneously with the activation of the first ignition device 4 or at a predetermined timing after the activation of the first ignition device 4. Compared with a so-called single type gas generator, the gas generator 100 can discharge a large amount of combustion gas to the outside with various output profiles by the combustion of the first gas generating agent 110 combusted by activating the first ignition device 4 and the combustion of the second gas generating agent 120 combusted by activating the second ignition device 7. Note that the second ignition device 7 is not always activated. The gas generator 100 may activate the first ignition device 4 and the second ignition device 7 depending on the strength of an impact sensed by a sensor (not illustrated), for example, only activating the first ignition device 4 without activating the second ignition device 7 when the impact is weak, or simultaneously activating the first ignition device 4 and the second ignition device 7 when the impact is strong.

Inner Tube Member

The first inner tube member 5 is a bottomed tubular member extending from the bottom plate portion 32 toward the top plate portion 22 and includes a surrounding wall portion 51 having a tubular shape and a lid wall portion 52 that closes one end portion of the surrounding wall portion 51. The first ignition device 4 is fitted or press-fitted to the other end portion of the surrounding wall portion 51, and thus the first inner tube member 5 is attached to the bottom plate portion 32. As illustrated in FIG. 1, the first ignition device 4 is surrounded by the surrounding wall portion 51 to form a transfer charge chamber 53 between the first inner tube member 5 and the first ignition device 4. The transfer charge 6 that is combusted by the activation of the first ignition device 4 is accommodated in the transfer charge chamber 53. The surrounding wall portion 51 of the first inner tube member 5 is provided with a plurality of communication holes h1 that allow an internal space (that is, the transfer charge chamber 53) and an external space to communicate with each other. The communication holes h1 are closed by a seal tape (not illustrated) in a state before the first ignition device 4 is activated.

The second inner tube member 8 is a bottomed tubular member extending from the bottom plate portion 32 toward the top plate portion 22 and includes a surrounding wall portion 81 having a tubular shape and a lid wall portion 82 that closes one end portion of the surrounding wall portion 81. The second ignition device 7 is fitted or press-fitted to the other end portion of the surrounding wall portion 81, and thus the second inner tube member 8 is attached to the bottom plate portion 32. As illustrated in FIG. 1, a second combustion chamber 20 in which the second ignition device 7 and the second gas generating agent 120 that is combusted by the activation of the second ignition device 7 are disposed is formed inside the second inner tube member 8. The surrounding wall portion 81 of the second inner tube member 8 is also provided with a plurality of communication holes h2 that allow an internal space (that is, the second combustion chamber 20) and the external space (that is, the first combustion chamber 10) to communicate with each other. The communication holes h2 are closed by a seal tape (not illustrated) in a state before the second ignition device 7 is activated.

Filter

As illustrated in FIG. 1, the filter 9 is formed into a tubular shape and is disposed in the first combustion chamber 10 in a manner that the filter 9 surrounds the first gas generating agent 110 and the gas discharge ports H1 are positioned radially outside the filter 9. That is, the filter 9 is disposed between the first gas generating agent 110 and the plurality of gas discharge ports H1 and surrounds the first gas generating agent 110. An upper end surface of the filter 9 is in contact with and supported by the top plate portion 22 of the upper shell 2, and a lower end surface is in contact with and supported by the bottom plate portion 32 of the lower shell 3. When the combustion gas of the first gas generating agent 110 and the second gas generating agent 120 passes through the filter 9, the filter 9 cools the combustion gas by removing heat of the combustion gas. In addition to the cooling function of the combustion gas, the filter 9 has a function of filtering the combustion gas by filtering a combustion residue contained in the combustion gas.

Transfer Charge

In addition to a known black powder, a gas generating agent having good ignition properties and a higher combustion temperature than that of the first gas generating agent 110 can be used as the transfer charge 6. A combustion temperature of the transfer charge 6 can be set within a range from 1700 to 3000° C. As the transfer charge 6, a known transfer charge containing, for example, nitroguanidine (34 wt. %) and strontium nitrate (56 wt. %) can be used. In addition, the transfer charge 6 may have various shapes, such as a granular shape, a pellet shape, a columnar shape, or a disk shape.

Gas Generating Agent

The first gas generating agent 110 is combusted by the actuation of the first igniter 41 to generate the combustion gas. The second gas generating agent 120 is combusted by the actuation of the second igniter 71 to generate the combustion gas. As the first gas generating agent 110 and the second gas generating agent 120, a gas generating agent having a relatively low combustion temperature can be used. The combustion temperature of each of the first gas generating agent 110 and the second gas generating agent 120 can be set within the range from 1000 to 1700° C. As the first gas generating agent 110 and the second gas generating agent 120, a known gas generating agent containing, for example, guanidine nitrate (41 wt. %), basic copper nitrate (49 wt. %), a binder, and an additive can be used. The first gas generating agent 110 and the second gas generating agent 120 may also have a variety of shapes, such as a granular shape, a pellet shape, a columnar shape, or a disk shape.

Gas Discharge Port

As illustrated in FIG. 1, the peripheral wall portion 11 of the housing 1 is formed with the plurality of gas discharge ports H1 that penetrate through the housing 1 from the inside to the outside of the housing 1 and that are aligned in a circumferential direction. The gas discharge port H1 penetrates through the housing 1 from an inner surface **11*a* (an inner peripheral surface of the peripheral wall portion 11) to an outer surface 11*b* (an outer peripheral surface of the peripheral wall portion 11) of the housing 1. The internal space (first combustion chamber 10) of the housing 1 and the external space of the housing 1 communicate with each other through the gas discharge port H1**. Thus, the gas discharge port H1 forms a flow path for discharging the combustion gas from the inside to the outside of the housing 1.

Here, in the present specification, an area of a cross section orthogonal to a flow direction of the combustion gas, of the gas flow path formed by the gas discharge port H1, is defined as a flow path cross-sectional area. In Embodiment 1, a direction in which the gas discharge port H1 penetrates through the housing 1, that is, the thickness direction of the housing 1 is the flow direction of the combustion gas. Then, the minimum cross-sectional area of the gas flow path is defined as a minimum flow path cross-sectional area. In the gas discharge port H1, a portion having the minimum flow path cross-sectional area is a rate-regulating portion (choke) of gas discharge. That is, a gas discharge amount per unit time of the gas discharge port H1 is determined according to the minimum flow path cross-sectional area. Then, an internal pressure of the housing 1 can be controlled by adjusting the number of gas discharge ports to be opened and an amount of gas to be discharged from the gas discharge ports per unit time.

As illustrated in FIG. 1, the plurality of gas discharge ports H1 include a plurality of large ports 12 and a plurality of small ports 13. The large port 12 and the small port 13 have different minimum flow path cross-sectional areas from each other. In the gas generator 100 according to Embodiment 1, the minimum flow path cross-sectional area of the large port 12 is larger than that of the small port 13. Thus, a gas discharge amount per unit time of the large port 12 is larger than that of the small port 13. As illustrated in FIG. 1, in the peripheral wall portion 11, a plurality of large ports 12 are disposed side by side in the circumferential direction, and a plurality of small ports 13 are disposed side by side in the circumferential direction at positions lower than those of the plurality of large ports 12. However, the arrangement of the large ports 12 and the small ports 13 is not limited to this.

Seal Tape

As illustrated in FIG. 1, the inner surface 11*a* of the housing 1 is attached with the seal tape S1. The seal tape S1 is an example of the "closing member" according to the present disclosure. The seal tape S1 is, for example, a band-shaped member in which a sticky agent layer is formed on one surface of a substrate layer made of a metal. The seal tape S1 is attached to the inner surface 11*a* of the housing 1 by the sticky agent layer adhering to the inner surface 11*a*. The substrate layer is preferably made of aluminum, but may be made of stainless steel or copper. As the sticky agent layer, a layer made of a known synthetic resin-based adhesive can be employed. The sticky agent is preferably a silicone-based, rubber-based or epoxy-based sticky agent or the like from the viewpoint of heat resistance and stickiness adhesiveness. However, the material of the seal tape S1 is not limited to the above.

As illustrated in FIG. 1, the seal tapes S1 is attached to the inner surface 11*a* while covering the openings of the gas discharge ports H1 on the inner surface 11*a* side of the housing 1, thereby closing the plurality of gas discharge ports H1. Before the actuation of the first igniter 41, the gas discharge ports H1 are closed by the seal tapes S1 to prevent outside air (moisture) from entering inside the housing 1 through the gas discharge ports H1, and the inside of the housing 1 is kept airtight.

As illustrated in FIG. 1, in Embodiment 1, the large ports 12 and the small ports 13 are closed with separate seal tapes S1. All the large ports 12 are collectively closed with one seal tape S1, and all the small ports 13 are collectively closed with another seal tape S1. Note that each of the plurality of gas discharge ports H1 may be closed with a separate seal tape, or all of the gas discharge ports H1 may be closed collectively with one seal tape.

When the first igniter 41 is activated, the seal tape S1 is pressurized by the generated gas to be ruptured, thereby opening the plurality of gas discharge ports H1. Here, in the present specification, a pressure required for opening each gas discharge port by rupturing the closing member (the seal tape S1 in the present example) at the gas discharge port is defined as a "rupturing pressure". When the closing member is ruptured, the closing member having received the pressure of the combustion gas is pressed against a peripheral edge of the opening of the gas discharge port on the inner surface side of the housing, and sheared along the peripheral edge. Thus, the rupturing pressure of the closing member at each gas discharge port is determined according to specifications of the closing member and features of the opening of the gas discharge port. The specifications of the closing member are specifically a tensile strength and a thickness of the closing member. The lower the tensile strength of the closing member is or the thinner the thickness of the closing member is, the lower the rupturing pressure is. Further, the features of the opening of the gas discharge port are specifically a shape or a peripheral length (length of the peripheral edge) of the opening of the gas discharge port on the inner surface side of the housing. The shape of the opening includes a projection or a chamfered portion formed on the peripheral edge of the opening in addition to a planar shape exhibited by the peripheral edge of the opening. When the projection is formed on the peripheral edge of the opening, the rupturing pressure becomes low, and when the peripheral edge of the opening is chamfered, the rupturing pressure becomes high. Also, the longer the peripheral length of the opening, the lower the rupturing pressure.

In the gas generator 100 according to Embodiment 1, a rupturing pressure of the seal tape S1 at the large port 12 is set to be lower than a rupturing pressure of the seal tape S1 at the small port 13. In setting the rupturing pressures at the large port 12 and the small port 13, for example, a peripheral length of the opening of the large port 12 on the inner surface 11*a* side of the housing 1 may be longer than a peripheral length of the opening of the small port 13 on the inner surface 11*a* side, or the seal tape S1 closing the large port 12 may be thinner than the seal tape S1 closing the small port 13.

First Small Port and Second Small Port

Figure 2:
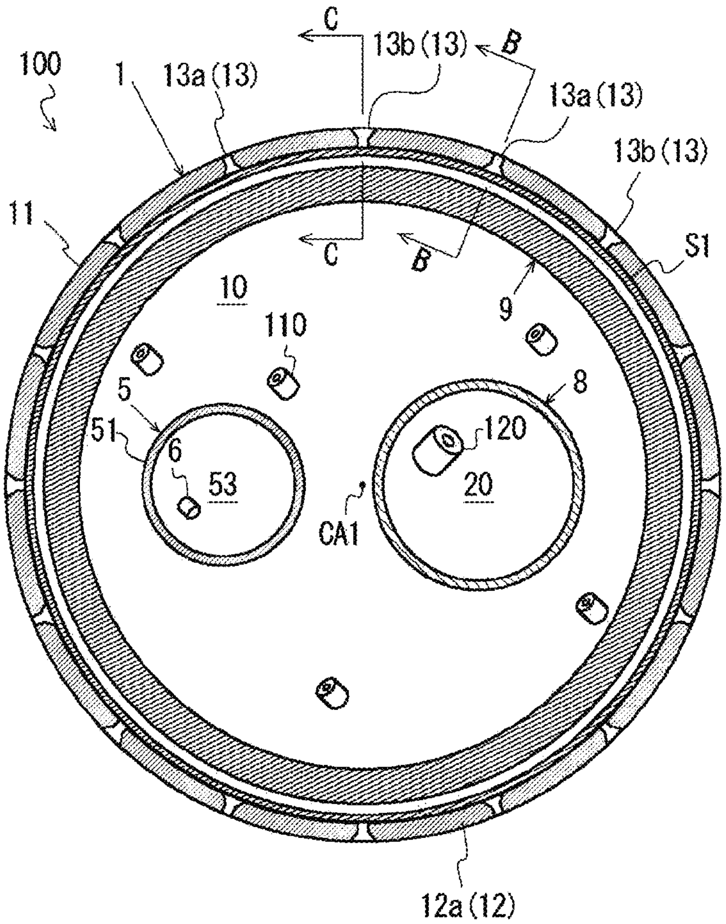
FIG. 2 is a cross-sectional view taken along a line A-A in FIG. 1.

FIG. 2 is a cross-sectional view taken along a line A-A in FIG. 1. FIG. 2 illustrates a cross section orthogonal to the center axis CA1 of the gas generator 100 before actuation. Note that in FIG. 2, the first ignition device 4, the second ignition device 7, and the joining portions 23 and 33 are omitted for convenience sake.

As illustrated in FIG. 2, the plurality of small ports 13 include a plurality of first small ports 13*a* and a plurality of second small ports 13*b*. The first small port 13*a* is an example of the "first gas discharge port" according to the present disclosure, and the second small port 13*b* is an example of the "second gas discharge port" according to the present disclosure. In the peripheral wall portion 11 of the housing 1, the first small ports 13*a* and the second small ports 13*b* are alternately disposed side by side at equal intervals in the circumferential direction.

In the gas generator 100 according to Embodiment 1, a gas discharge amount per unit time of the first small port 13*a* and a gas discharge amount per unit time of the second small port 13*b* are made equivalent to each other, but a rupturing pressure of the seal tape S1 at the first small port 13*a* and a rupturing pressure of the seal tape S1 at the second small port 13*b* are made slightly different from each other. As will be described in detail later, in the gas generator 100 according to Embodiment 1, the features of the opening of the small port 13 on the inner surface 11*a* side are set in a manner that the rupturing pressure of the seal tape S1 at the first small port 13*a* is lower than the rupturing pressure of the seal tape S1 at the second small port 13*b*. However, this does not limit the magnitude relationship between the rupturing pressure at the first gas discharge port (first small port) and the rupturing pressure at the second gas discharge port (second small port) in the technique according to the embodiment of the present disclosure. In addition, in the technique according to the embodiment of the present disclosure, it is not essential that both of the number of first gas discharge ports and the number of second gas discharge ports are plural, and it is sufficient that the plurality of gas discharge ports include at least one first gas discharge port and at least one second gas discharge port that are configured such that rupturing pressures of the closing member thereat are different from each other. In addition, the arrangement of the first gas discharge ports and the second gas discharge ports in the technique according to the embodiment of the present disclosure is not limited to the above. For example, a plurality of first gas discharge ports or a plurality of second gas discharge ports may be unevenly distributed.

Figure 3:
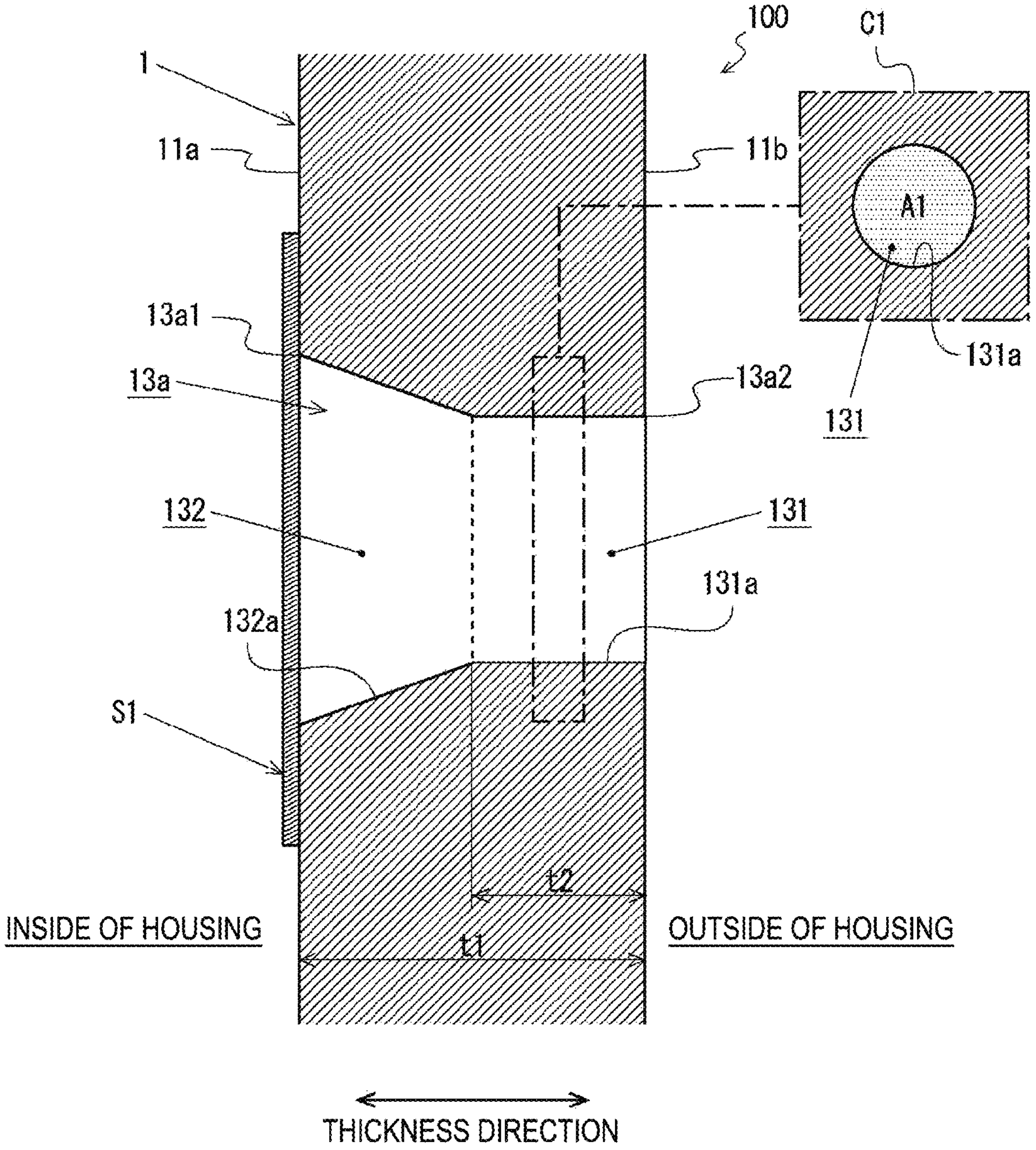
FIG. 3 is an enlarged cross-sectional view for describing a shape of a first small port according to Embodiment 1.

FIG. 3 is an enlarged cross-sectional view for describing a shape of the first small port 13*a* according to Embodiment 1. FIG. 3 illustrates a cross-sectional view taken along a line B-B in FIG. 2. In FIG. 3, a reference sign 13*a*1 denotes the opening of the first small port 13*a* on the inner surface 11*a* side of the housing 1, and a reference sign 13*a*2 denotes the opening of the first small port 13*a* on the outer surface 11*b* side of the housing 1. The first small port 13*a* according to Embodiment 1 is formed as a port having a cross section, with a circular shape (perfect circular shape), orthogonal to the thickness direction (gas flow direction) of the housing 1. An opening 13*a*1 of the first small port 13*a* is covered with the seal tape S1.

As illustrated in FIG. 3, the first small port 13*a* includes a straight portion 131 and a tapered portion 132. The straight portion 131 has a cross section being constant (in cross-sectional shape and cross-sectional area) in the thickness direction of the housing 1. An inner wall surface 131*a* forming the straight portion 131 has a cylindrical shape with a constant diameter in the thickness direction of the housing 1. The tapered portion 132 is continuous with the straight portion 131 and is formed in a manner that a cross-sectional area thereof increases with distance from the straight portion 131 in the thickness direction of the housing 1. An inner wall surface 132*a* forming the tapered portion 132 has a cylindrical shape whose diameter increases with distance from the straight portion 131 in the thickness direction of the housing 1. In the first small port 13*a* according to Embodiment 1, the tapered portion 132 opens on the inner surface 11*a* side of the housing 1, and the straight portion 131 opens on the outer surface 11*b* side of the housing 1. The tapered portion 132 of the first small port 13*a* opens at the inner surface 11*a* to form the opening 13*a*1. The straight portion 131 of the first small port 13*a* opens at the outer surface 11*b* to form the opening 13*a*2. Although details will be described later, the first small port 13*a* according to Embodiment 1 is formed by punching a hole from the outer surface 11*b* side of the housing 1. The inner wall surface 131*a* of the straight portion 131 is formed as a shear surface by punching. The inner wall surface 132*a* of the tapered portion 132 is formed as a fracture surface by punching. The shear surface is formed as a relatively smooth surface having metallic luster, and the fracture surface is formed as a relatively rough surface having no metallic luster.

As illustrated in FIG. 3, a cross-sectional area of a gas flow path formed by the first small port 13*a* is minimized in the straight portion 131. That is, in the first small port 13*a*, the straight portion 131 serves as a choke for gas discharge. A minimum flow path cross-sectional area of the first small port 13*a* is denoted by A1. A cross-sectional view C1 in FIG. 3 indicates a cross section of the straight portion 131 orthogonal to the thickness direction of the housing 1. As illustrated in the cross-sectional view C1, in the first small port 13*a* according to Embodiment 1, the cross-sectional area of the straight portion 131 is the minimum flow path cross-sectional area A1.

Figure 4:
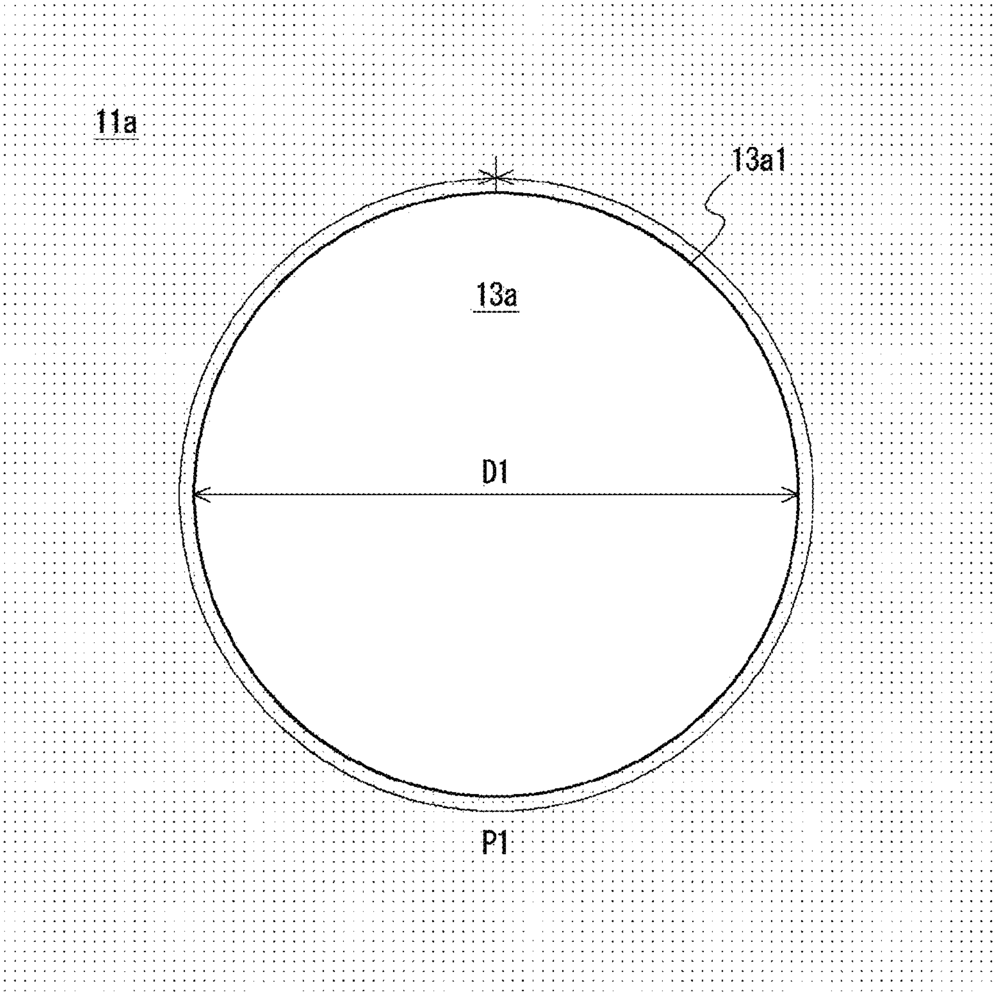
FIG. 4 is a diagram illustrating a shape of an opening of the first small port on an inner surface side of a housing according to Embodiment 1.

FIG. 4 is a diagram illustrating a shape of the opening portion 13*a*1, on the inner surface 11*a* side of the housing 1, of the first small port 13*a* according to Embodiment 1. As illustrated in FIG. 4, a planar shape exhibited by the peripheral edge of the opening 13*a*1 of the first small port 13*a* is circular. A diameter of the opening 13*a*1 is denoted by D1, and a peripheral length of the opening 13*a*1 (a length of the peripheral edge of the opening 13*a*1) is denoted by P1.

Figure 5:
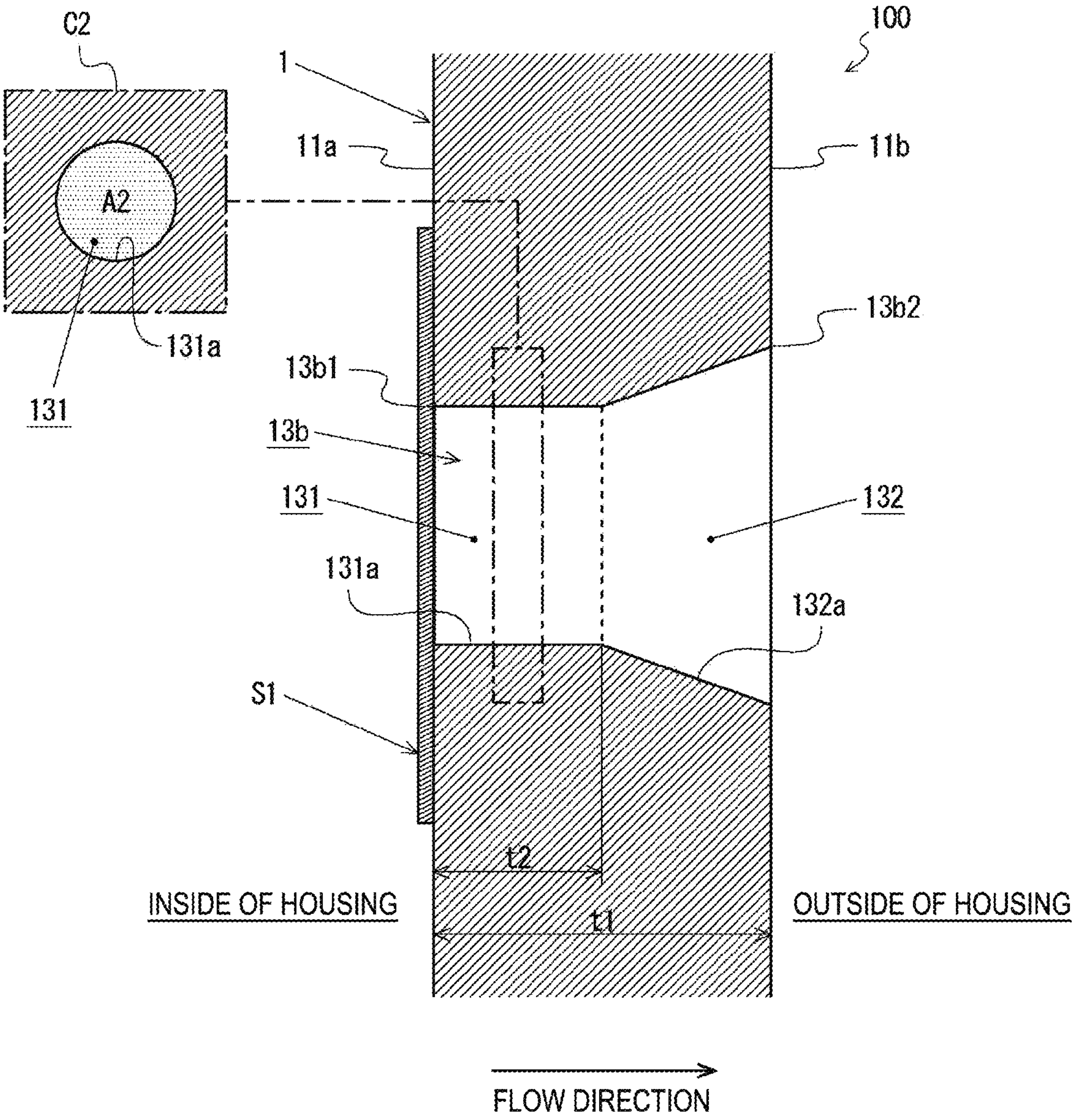
FIG. 5 is an enlarged cross-sectional view for describing a shape of a second small port according to the Embodiment 1.

FIG. 5 is an enlarged cross-sectional view for describing a shape of the second small port 13*b* according to Embodiment 1. FIG. 5 illustrates a cross-sectional view taken along a line C-C in FIG. 2. In FIG. 5, a reference sign 13*b*1 denotes an opening of the second small port 13*b* on the inner surface 11*a* side of the housing 1, and a reference sign 13*b*2 denotes an opening of the second small port 13*b* on the outer surface 11*b* side of the housing 1. Similarly to the first small port 13*a*, the second small port 13*b* according to Embodiment 1 is formed as a port having a circular cross section orthogonal to the thickness direction (gas flow direction) of the housing 1. The opening 13*b*1 of the second small port 13*b* is covered with the seal tape S1.

Similarly to the first small port 13*a*, the second small port 13*b* includes the straight portion 131 constituted by a shear surface and the tapered portion 132 constituted by a fracture surface. A diameter of the straight portion 131 of the second small port 13*b* is equivalent to a diameter of the straight portion 131 of the first small port 13*a*. In the second small port 13*b* according to Embodiment 1, contrary to the first small port 13*a*, the straight portion 131 opens on the inner surface 11*a* side of the housing 1, and the tapered portion 132 opens on the outer surface 11*b* side of the housing 1. The straight portion 131 of the second small port 13*b* opens at the inner surface 11*a* to form the opening 13*b*1. The tapered portion 132 of the second small port 13*b* opens at the outer surface 11*b* to form the opening 13*b*2. Although details will be described later, the second small port 13*b* according to Embodiment 1 is formed by punching a hole from the inner surface 11*a* side of the housing 1, contrary to the first small port 13*a*.

As illustrated in FIG. 5, similarly to the first small port 13*a*, a cross-sectional area of a gas flow path formed by the second small port 13*b* is minimized in the straight portion 131. That is, also in the second small port 13*b*, the straight portion 131 serves as a choke for gas discharge. A minimum flow path cross-sectional area of the second small port 13*b* is denoted by A2. A cross-sectional view C2 in FIG. 5 illustrates a cross section of the straight portion 131 orthogonal to the thickness direction of the housing 1. As illustrated in the cross-sectional view C2, in the second small port 13*b* according to Embodiment 1, the cross-sectional area of the straight portion 131 is the minimum flow path cross-sectional area A2.

Figure 6:
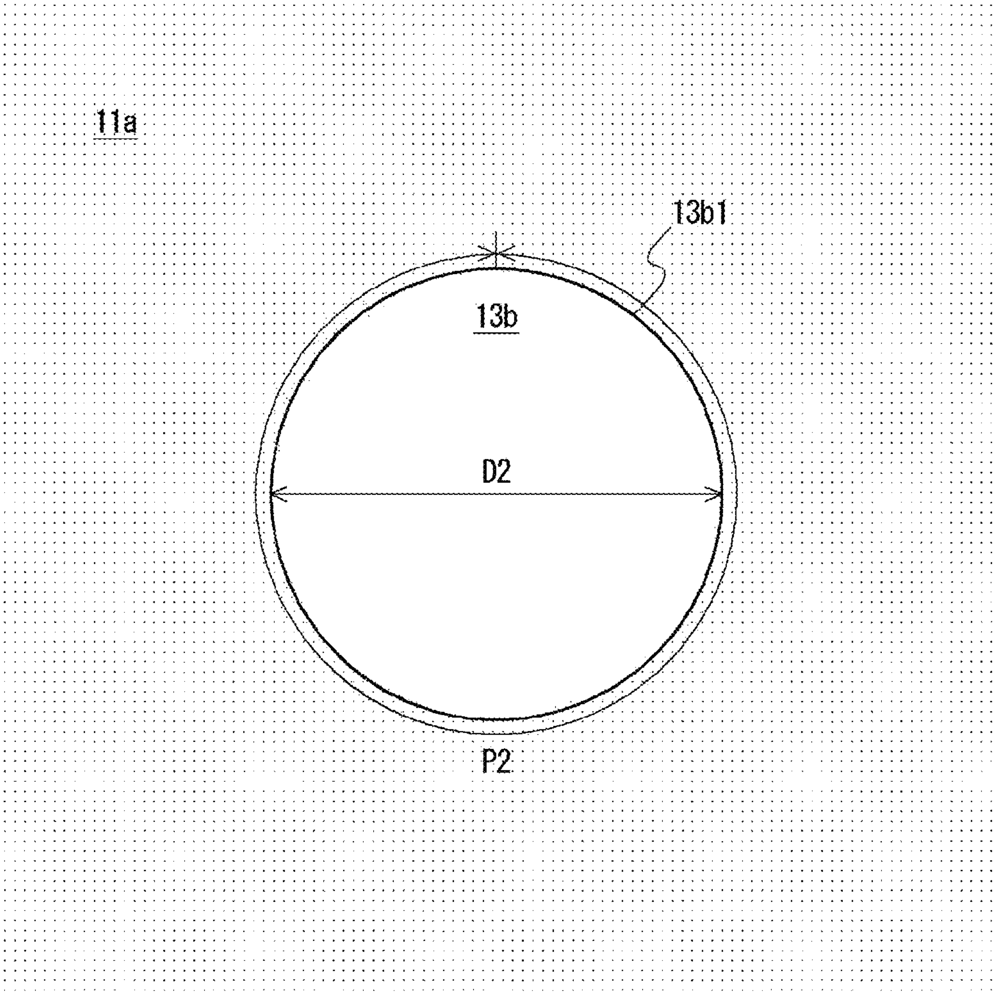
FIG. 6 is a diagram illustrating a shape of an opening of the second small port on the inner surface side of the housing according to Embodiment 1.

FIG. 6 is a diagram illustrating a shape of the opening 13*b*1 of the second small port 13*b* on the inner surface 11*a* side of the housing 1 according to the Embodiment 1. As illustrated in FIG. 6, a planar shape exhibited by the peripheral edge of the opening 13*b*1 of the second small port 13*b* is circular, similarly to the opening 13*a*1 of the first small port 13*a*. A diameter of the opening 13*b*1 is denoted by D2, and a peripheral length of the opening 13*b*1 (a length of the peripheral edge of the opening 13*b*1) is denoted by P2.

Here, the minimum flow path cross-sectional area and the features of the opening on the inner surface 11*a* side of the housing 1 will be compared between the first small port 13*a* and the second small port 13*b*. As described above, the first small port 13*a* and the second small port 13*b* have the smallest flow path cross-sectional areas in the straight portions 131 having the same diameter as each other. Therefore, the minimum flow path cross-sectional area A1 of the first small port 13*a* is equivalent to the minimum flow path cross-sectional area A2 of the second small port 13*b*. That is, a relationship of A1=A2 is satisfied. Thus, the first small port 13*a* and the second small port 13*b* have the gas discharge amounts per unit time that are equivalent to each other. Further, as illustrated in FIG. 4 and FIG. 6, the opening 13*a*1 of the first small port 13*a* and the opening 13*b*1 of the second small port 13*b* have the same circular shape. Here, since the opening 13*a*1 of the first small port 13*a* is constituted by the tapered portion 132 while the opening 13*b*1 of the second small port 13*b* is constituted by the straight portion 131, the opening 13*a*1 of the first small port 13*a* and the opening 13*b*1 of the second small port 13*b* have different port diameters from each other. To be specific, the diameter D1 of the opening 13*a*1 is larger than the diameter D2 of the opening 13*b*1. Since a relationship of D1>D2 is satisfied, the peripheral length P1 of the opening 13*a*1 of the first small port 13*a* is longer than the peripheral length P2 of the opening 13*b*1 of the second small port 13*b*. That is, a relationship of P1>P2 is satisfied. Therefore, the rupturing pressure of the seal tape S1 at the first small port 13*a* is lower than the rupturing pressure of the seal tape S1 at the second small port 13*b*. As a result, the first small port 13*a* more easily opens compared to the second small port 13*b*.

Method for Producing Gas Generator

Figure 7:
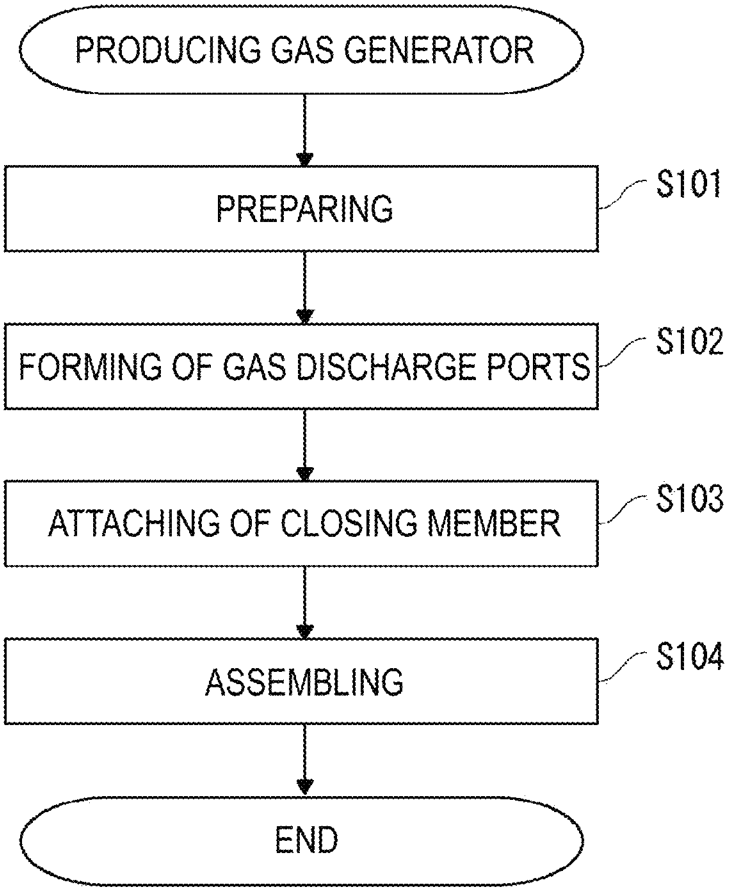
FIG. 7 is a flowchart of a method for producing a gas generator according to Embodiment 1.

Next, the method for producing the gas generator according to the first embodiment will be described. Note that the method for producing the gas generator according to the embodiment of the present disclosure is not limited to the following method. FIG. 7 is a flowchart of the method for producing the gas generator according to Embodiment 1. As illustrated in FIG. 7, the method of producing the gas generator according to Embodiment 1 includes step S101 of preparing, step S102 of forming gas discharge ports, step S103 of attaching a closing member, and step S104 of assembling.

First, in the step S101 of preparing, the first ignition device 4, the first inner tube member 5, the transfer charge 6, the second ignition device 7, the second inner tube member 8, the filter 9, the upper shell 2, the lower shell 3, the first gas generating agent 110, the second gas generating agent 120, and the seal tapes S1 are prepared.

Next, in the step S102 of forming the gas discharge ports, the plurality of gas discharge ports H1 are formed in the housing 1 in a manner that rupturing pressures of the seal tape S1 at the first small port 13*a* and the second small port 13*b* are different from each other. Specifically, the plurality of large ports 12 and the plurality of small ports 13 are formed by punching holes at the upper peripheral wall portion 21 of the upper shell 2. In the punching of the large ports 12, a punch having a diameter larger than that of a punch that is used in the punching of the small ports 13 is used. Thus, the minimum flow path cross-sectional area of the large port 12 becomes larger than the minimum flow path cross-sectional area of the small port 13. As a result, the large port 12 discharges a larger amount of gas per unit time than that of the small port 13.

Figure 8:
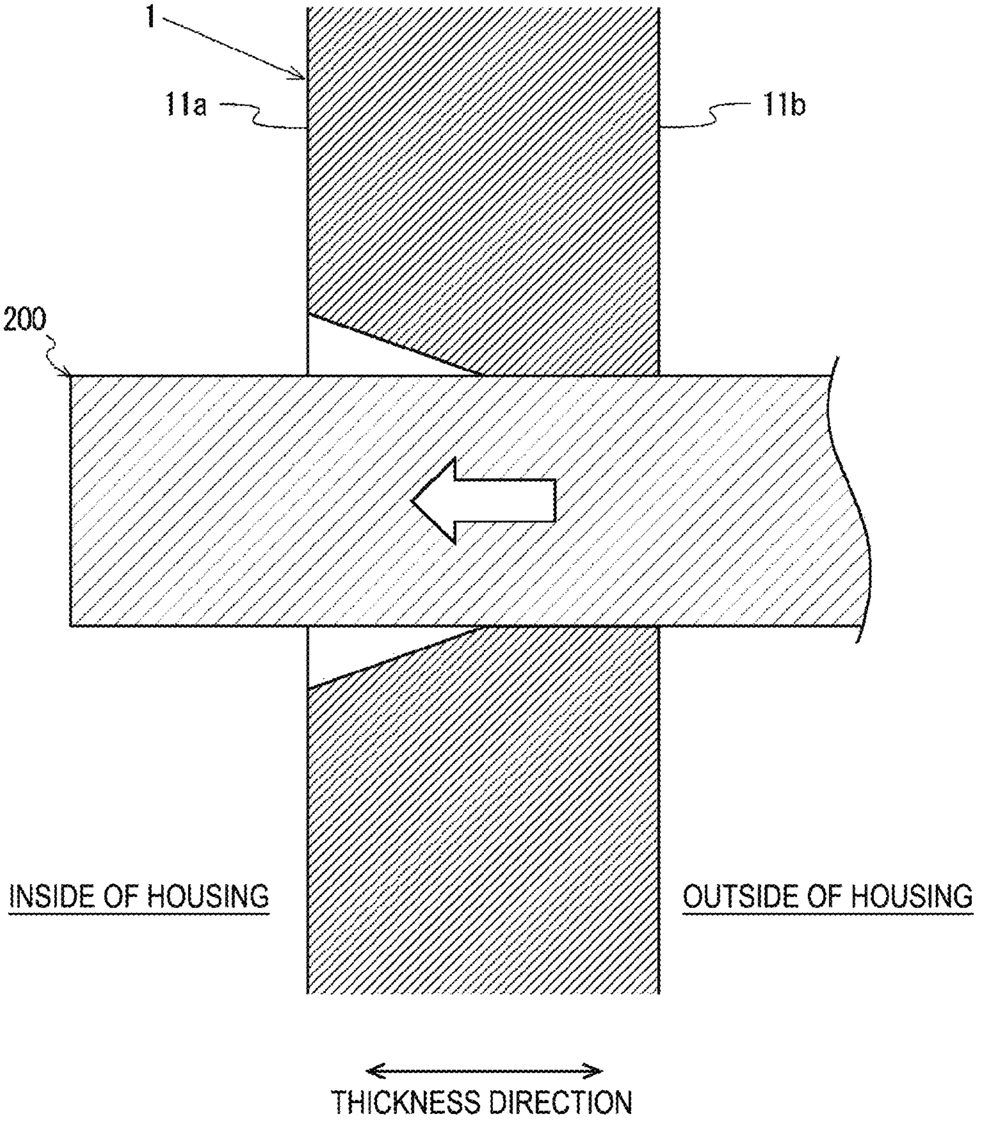
FIG. 8 is a cross-sectional view for describing a method of forming the first small port according to Embodiment 1.
Figure 9:
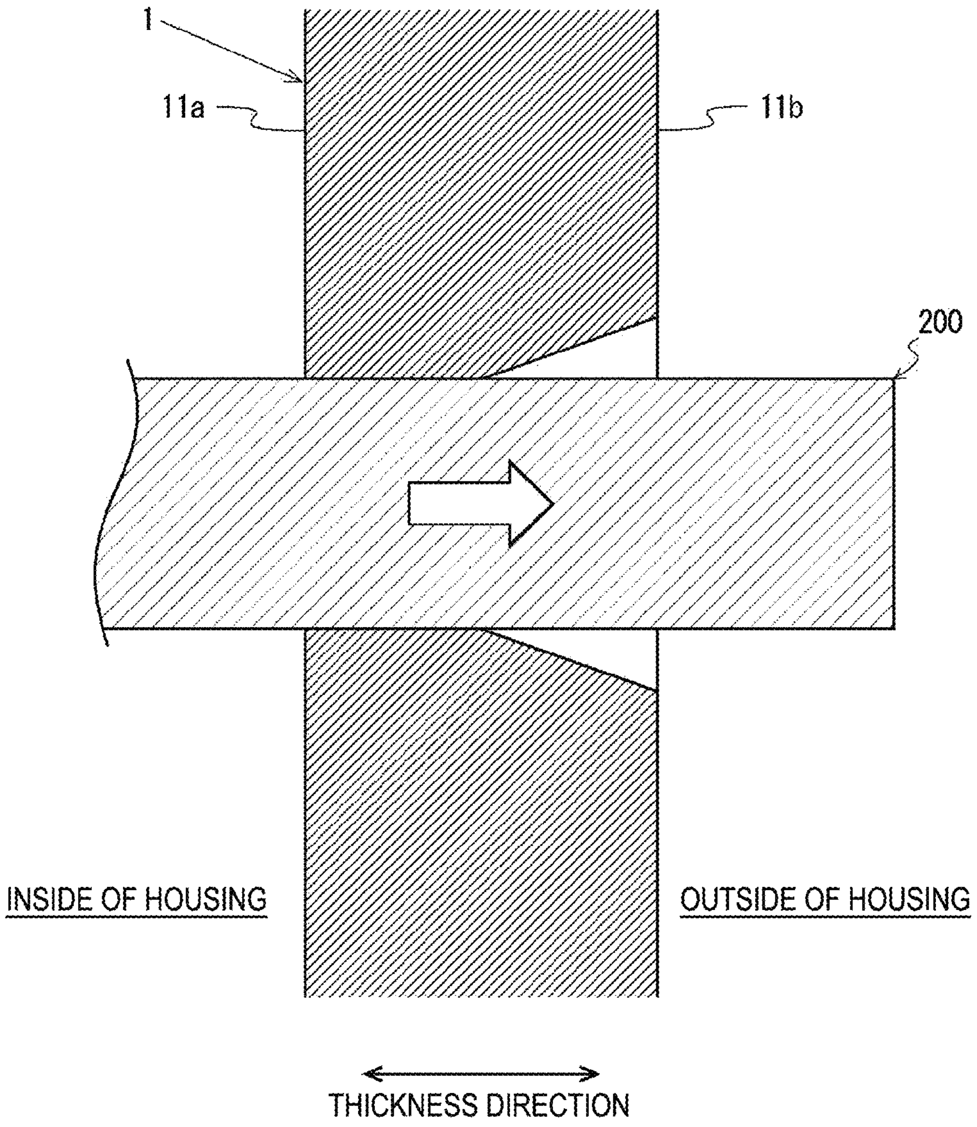
FIG. 9 is a cross-sectional view for describing a method of forming the second small port according to Embodiment 1.

Further, in the forming of the plurality of small ports 13, the punching is performed in a manner that the rupturing pressure of the seal tape S1 at the first small port 13*a* is different from the rupturing pressure of the seal tape S1 at the second small port 13*b*. FIG. 8 is a cross-sectional view for describing a method of forming the first small port 13*a* according to Embodiment 1. Additionally, FIG. 9 is a cross-sectional view for describing a method of forming the second small port 13*b* according to Embodiment 1. The first small port 13*a* and the second small port 13*b* are formed by punching using punches having the same diameter. A reference sign 200 in FIG. 8 and FIG. 9 denotes a punch that is used for processing. As illustrated in FIG. 8, the first small port 13*a* is formed by punching a hole from the outer surface 11*b* side of the housing 1. Thus, in the first small port 13*a*, the straight portion 131 is constituted by a shear surface on the outer surface 11*b* side of the housing 1, and the tapered portion 132 is constituted by a fracture surface on the inner surface 11*a* side of the housing 1. Further, as illustrated in FIG. 9, the second small port 13*b* is formed by punching a hole from the inner surface 11*a* side of the housing 1. Thus, in the second small port 13*b*, the straight portion 131 is formed on the inner surface 11*a* side of the housing 1, and the tapered portion 132 is formed on the outer surface 11*b* side of the housing 1.

In the forming of the gas discharge ports, since the punches 200 having the same diameter are used for the first small port 13*a* and the second small port 13*b*, the straight portions 131 having the same diameter are individually formed in the first small port 13*a* and the second small port 13*b*. Therefore, the minimum flow path cross-sectional area A1 in the first small port 13*a* and the minimum flow path cross-sectional area A2 in the second small port 13*b* are equivalent to each other. Further, in the forming of the gas discharge ports, by making the punching directions of the first small port 13*a* and the second small port 13*b* opposite to each other, the positional relationship of the straight portion 131 and the tapered portion 132 becomes opposite between the first small port 13*a* and the second small port 13*b*. Thus, the peripheral lengths of the opening 13*a*1 of the first small port 13*a* and the opening 13*b*1 of the second small port 13*b* are different from each other. In the present example, the peripheral length P1 of the opening 13*a*1 of the first small port 13*a* is longer than the peripheral length P2 of the opening 13*b*1 of the second small port 13*b*.

Next, in the step S103 of attaching the closing member, the seal tapes S1 are attached to the inner surface 11*a* of the housing 1 and thus cover the openings of the plurality of gas discharge ports H1 on the inner surface 11*a* side of the housing 1. Thus, all of the plurality of gas discharge ports H1 are closed. In the present example, all the large ports 12 are collectively closed with one seal tape S1, and all the small ports 13 are collectively closed with another seal tape S1. Therefore, the first small port 13*a* and the second small port 13*b* are closed with the seal tape S1 having the same specification.

Next, in the step S104 of assembling, the first ignition device 4 and the second ignition device 7 are attached to the lower shell 3, the first inner tube member 5 filled with the transfer charge 6 is fixed to the first ignition device 4, and the second inner tube member 8 filled with the second gas generating agent 120 is fixed to the second ignition device 7. Thereafter, the filter 9 is disposed at the lower shell 3, and the inside of the filter 9 is filled with the first gas generating agent 110. Finally, the upper shell 2 is put over the lower shell 3, and then, the joining portion 23 of the upper shell 2 and the joining portion 33 of the lower shell 3 are overlapped and joined by laser welding or the like to form the housing 1. As described above, the gas generator 100 is assembled.

Operation

A basic operation of the gas generator 100 according to the first embodiment will be described below with reference to FIG. 1. In this example, a case in which the second ignition device 7 is activated following the first ignition device 4 (that is, after the first ignition device 4 is activated) will be described.

When a sensor (not illustrated) senses an impact, an ignition current is supplied to the first igniter 41 of the first ignition device 4 and the first igniter 41 is activated. Then, the ignition charge accommodated in the first igniter 41 is combusted, and a flame, a high-temperature gas, and the like, which are combustion products of the ignition charge, are discharged to the inside of the transfer charge chamber 53. Thus, the transfer charge 6 accommodated in the transfer charge chamber 53 is combusted, and a combustion gas is generated in the transfer charge chamber 53. When the seal tape closing the communication holes h1 of the surrounding wall portion 51 of the first inner tube member 5 is ruptured due to the pressure of the combustion gas of the transfer charge 6, the combustion gas is discharged to the outside of the transfer charge chamber 53 through the communication holes h1. Then, the combustion gas of the transfer charge 6 comes into contact with the first gas generating agent 110 disposed around the surrounding wall portion 51, and the first gas generating agent 110 is ignited. When the first gas generating agent 110 is combusted, a high-temperature and high-pressure combustion gas is generated in the first combustion chamber 10. The seal tapes S1 are ruptured by the pressure of the combustion gas to open the plurality of gas discharge ports H1. When this combustion gas passes through the filter 9, the combustion gas is cooled, and a combustion residue is filtered. The combustion gas of the first gas generating agent 110 cooled and filtered by the filter 9 is discharged through the plurality of gas discharge ports H1 to the outside of the housing 1.

Subsequently, when the second igniter 71 of the second ignition device 7 is activated, the second gas generating agent 120 accommodated in the second combustion chamber 20 is combusted, and a combustion gas is generated in the second combustion chamber 20. When the seal tape closing the communication holes h2 of the surrounding wall portion 81 of the second inner tube member 8 is ruptured by the pressure of the combustion gas of the second gas generating agent 120, the combustion gas is discharged to the first combustion chamber 10 through the communication holes h2. After being cooled and filtered by the filter 9, the combustion gas of the second gas generating agent 120 is discharged through the plurality of gas discharge ports H1 to the outside of the housing 1.

The combustion gases of the first gas generating agent 110 and the second gas generating agent 120 flow into an airbag (not illustrated) after being discharged to the outside of the housing 1. This causes the airbag to inflate, forming a cushion between an occupant and a rigid structure and protecting the occupant from an impact.

Regarding Open Timing

Now, in general, combustion performance of a gas generating agent tends to improve as a temperature or pressure around the gas generating agent increases. That is, a low-temperature and low-pressure environment causes inactive combustion of the gas generating agent. Thus, for example, it is necessary to maintain the internal pressure of the housing during the low-temperature activation, particularly at the initial stage where the gas generating agent starts to be combusted, and thus a difference in output performance of the gas generator between the activation at a high temperature (high-temperature activation) and the activation at a low temperature (low-temperature activation) can be reduced and the output performance can be stabilized.

As described above, in the gas generator 100 according to Embodiment 1, the rupturing pressure of the seal tape S1 at the large port 12 is set to be lower than the rupturing pressure of the seal tape S1 at the small port 13. For example, it is assumed that the first igniter 41 and the second igniter 71 are activated at the same time at the time of low-temperature activation and all of the first gas generating agent 110 and the second gas generating agent 120 are combusted. In this case, at the initial stage, only the large ports 12 among the plurality of gas discharge ports H1 open as the internal pressure of the housing 1 increases. As a result of this, a part of the combustion gas is discharged, and thus, the internal pressure of the housing 1 lowers. However, since the small ports 13 are closed, the combustion performance of the gas generating agent is maintained. When the internal pressure of the housing 1 further increases along with the combustion of the gas generating agent, the small ports 13 open with a delay from the opening of the large ports 12. However, if all the small ports 13 (all the first small ports 13*a* and all the second small ports 13*b*) open at the same time, there is a concern that the internal pressure of the housing 1 rapidly drops and the combustion performance of the gas generating agent deteriorates. On the other hand, in the gas generator 100 according to Embodiment 1, the ease of opening is made different between the first small port 13*a* and the second small port 13*b* by making the rupturing pressure of the seal tape S1 slightly different between the first small port 13*a* and the second small port 13*b*. Therefore, the first small ports 13*a* at which rupturing pressure is relatively low open relatively early, and the second small ports 13*b* at which rupturing pressure is relatively high open relatively late. The open timings are made different between the first small port 13*a* and the second small port 13*b*, and thus all the small ports 13 do not open at the same time so that a sudden drop in internal pressure of the housing 1 is suppressed, and the combustion performance of the gas generating agent is maintained.

Actions and Effects

As described above, the gas generator 100 according to Embodiment 1 includes the housing 1 accommodating the first igniter 41 and the first gas generating agent 110 therein, the plurality of gas discharge ports H1 penetrating through the housing 1 from the inside to the outside of the housing 1, and the seal tape S1 attached to the inner surface 11*a* of the housing 1. The seal tape S1 covers the openings of the plurality of gas discharge ports H1 on the inner surface 11*a* side of the housing 1 before actuation of the gas generator 100 to close the plurality of gas discharge ports H1, and is ruptured by the pressure of the combustion gas generated in the housing 1 by the actuation of the gas generator 100 to open the plurality of gas discharge ports H1. The plurality of gas discharge ports H1 include at least one first small port 13*a* and at least one second small port 13*b* that are configured such that rupturing pressures of the seal tape S1 thereat are different from each other. The minimum flow path cross-sectional area A1 of the gas flow path formed by the first small port 13*a* is equivalent to the minimum flow path cross-sectional area A2 of the gas flow path formed by the second small port 13*b*, and the first small port 13*a* and the second small port 13*b* have different peripheral lengths of the openings on the inner surface 11*a* side of the housing 1 from each other, differentiating the rupturing pressures from each other.

According to the gas generator 100 configured as described above, by making the minimum flow path cross-sectional area for controlling the gas discharge amount equivalent between the first small port 13*a* and the second small port 13*b*, the gas discharge amount per unit time of the first small port 13*a* and the gas discharge amount per unit time of the second small port 13*b* can be made equivalent to each other. Furthermore, by making the peripheral length of the opening on the inner surface 11*a* side of the housing 1 different between the first small port 13*a* and the second small port 13*b*, the rupturing pressures at the first small port 13*a* and the second small port 13*b* can be made different from each other. That is, it is possible to intentionally set two types of gas discharge ports having equivalent internal pressure control functions for the housing 1 and different ease of opening. According to this configuration, the open timings of the first small port 13*a* and the second small port 13*b* are made different from each other, and thus, a rapid internal pressure drop of the housing 1 can be suppressed at the initial stage of activation of the gas generator 100. As a result, the combustion performance of the gas generating agent can be maintained and the output performance of the gas generator 100 can be stabilized.

Further, in the gas generator 100 according to Embodiment 1, the first small ports 13*a* and the second small ports 13*b* are closed with the seal tape S1 having the same specification. That is, a difference between the rupturing pressures is generated not by a difference in specification of the seal tape S1 but by a difference between the features (peripheral lengths) of the opening 13*a*1 of the first small port 13*a* and the opening 13*b*1 of the second small port 13*b*. According to this, since it is not necessary to make the specification of the seal tape S1 different between the first small port 13*a* and the second small port 13*b*, all the small ports 13 can be covered with a common (one) seal tape S1. However, in the technique according to the embodiment of the present disclosure, the specification of the closing member may be different between the first gas discharge port and the second gas discharge port.

Note that although the gas generator 100 according to Embodiment 1 is configured such that the rupturing pressure at the first small port 13*a* is lower than the rupturing pressure at the second small port 13*b*, the magnitude relationship between the rupturing pressure at the first gas discharge port and the rupturing pressure at the second gas discharge port in the technique according to the embodiment of the present disclosure is not limited to the above. The rupturing pressure at the first gas discharge port may be higher than the rupturing pressure at the second gas discharge port. In addition, in the gas generator 100 according to Embodiment 1, the large port 12 and the small port 13 having different minimum flow path cross-sectional areas are included in the plurality of gas discharge ports H1. However, in the technology according to the embodiment of the present disclosure, it is not essential that a plurality of types of gas discharge ports having different minimum flow path cross-sectional areas are provided.

In the technique according to the embodiment of the present disclosure, the plurality of gas discharge ports may include, in addition to the first gas discharge port and the second gas discharge port, a gas discharge port that has a minimum flow path cross-sectional area equivalent to those of the first gas discharge port and the second gas discharge port and is configured such that a rupturing pressure of the closing member is different from those at the first gas discharge port and the second gas discharge port. That is, three or more types of gas discharge ports that have minimum flow path cross-sectional areas equivalent to one another and are configured such that rupturing pressures of the closing member thereat are different from one another may be provided.

In the gas generator 100 according to Embodiment 1, each of the first small port 13*a* and the second small port 13*b* is formed as a port having a circular cross section, and the first small port 13*a* and the second small port 13*b* have the port diameters (D1, D2) of the openings (13*a*1, 13*b*1), on the inner surface 11*a* side of the housing 1, different from each other. This can make the peripheral length (P1, P2) of the opening on the inner surface 11*a* side of the housing 1 different between the first small port 13*a* and the second small port 13*b*. Note that each of the cross-sectional shapes of the first gas discharge port and the second gas discharge port, and the shapes of the openings of the first gas discharge port and the second gas discharge port is not limited to a circular shape, and various shapes such as an elliptical shape, an oval shape, and a polygonal shape can be adopted in the technique according to the embodiment of the present disclosure.

Further, each of the first small port 13*a* and the second small port 13*b* according to Embodiment 1 includes the straight portion 131 having a constant cross-section in the thickness direction of the housing 1 and the tapered portion 132 continuous with the straight portion 131 and having a cross-sectional area that increases with distance from the straight portion 131 in the thickness direction. In either (the first small port 13*a*) of the first small port 13*a* or the second small port 13*b*, the tapered portion 132 opens on the inner surface 11*a* side of the housing 1, and the straight portion 131 opens on the outer surface 11*b* side of the housing 1. Further, in the other (the second small port 13*b*), the straight portion 131 opens on the inner surface 11*a* side of the housing 1, and the tapered portion 132 opens on the outer surface 11*b* side of the housing 1. By making the positional relationship of the straight portion 131 and the tapered portion 132 opposite between the first small port 13*a* and the second small port 13*b* as described above, the minimum flow path cross-sectional areas of the first small port 13*a* and the second small port 13*b* are equivalent to each other, but the rupturing pressures thereat of the seal tape S1 can be made different from each other. Note that in the technique according to the embodiment of the present disclosure, the second gas discharge port (the second small port 13*b*) may include a tapered portion opening on the inner surface side of the housing and a straight portion opening on the outer surface side of the housing, and the first gas discharge port (the first small port 13*a*) may include a straight portion opening on the inner surface side of the housing and a tapered portion opening on the outer surface side of the housing.

In addition, in the gas generator 100 according to Embodiment 1, the straight portion 131 is constituted by a shear surface, and the tapered portion 132 is constituted by a fracture surface. The gas discharge port H1 including the straight portion 131 and the tapered portion 132, as described above, can be suitably formed by punching. However, in the technique according to the embodiment of the present disclosure, the method of forming the first gas discharge port and the second gas discharge port in the housing is not limited to the punching. For example, the first gas discharge port and the second gas discharge port may be formed by drilling holes.

As illustrated in FIG. 3 and FIG. 5, the thickness of the housing 1 is denoted by t1, and the length of the straight portion 131 of the small port 13 in the thickness direction of the housing 1 is denoted by t2. In this case, a relationship of $0.3<t2/t1<0.7$ may be satisfied. Such a gas discharge port H1 can be suitably formed by punching. However, in the technique according to the embodiment of the present disclosure, the relationship between the thickness of the housing and the length of the straight portion is not limited to the above.

Furthermore, the method for producing the gas generator 100 according to Embodiment 1 includes forming the plurality of gas discharge ports H1 including at least one first small port 13*a* and at least one second small port 13*b* in the housing 1, and attaching the seal tape S1 to the inner surface 11*a* of the housing 1 and thus covering the openings of the plurality of gas discharge ports H1 on the inner surface 11*a* side of the housing 1. In the forming of the plurality of gas discharge ports H1 in the housing 1, the minimum flow path cross-sectional area A1 of the gas flow path formed by the first small port 13*a* and the minimum flow path cross-sectional area A2 of the gas flow path formed by the second small port 13*b* are made equivalent to each other, and the first small port 13*a* and the second small port 13*b* have the peripheral lengths of the openings, on the inner surface 11*a* side of the housing 1, different from each other. As described above, in the method for producing the gas generator 100, the plurality of gas discharge ports H1 are formed in the housing 1 in a manner that the rupturing pressure of the seal tape S1 is different between the first small port 13*a* and the second small port 13*b*. According to such a production method, the open timings of the first small port 13*a* and the second small port 13*b* are made different from each other, and a rapid internal pressure drop of the housing 1 can be suppressed. That is, the gas generator 100 having stable output performance can be produced.

Further, in the method for producing the gas generator 100 according to Embodiment 1, in the forming of the plurality of gas discharge ports H1 in the housing 1, the first small port 13*a* is formed by punching a hole from the outer surface 11*b* side of the housing 1, and the second small port 13*b* is formed by punching a hole from the inner surface 11*a* side of the housing 1. That is, the punching directions of the first small port 13*a* and the second small port 13*b* are opposite to each other. Thus, the first small port 13*a* and the second small port 13*b* can have the peripheral lengths of the openings, on the inner surface 11*a* side of the housing 1, different from each other. Note that such a difference in peripheral length between the openings of the gas discharge ports on the inner surface 11*a* side of the housing 1 may be applied to the large ports 12 other than the first small port 13*a* and the second small port 13*b*.

Modified Examples of First Embodiment

A gas generator 100 according to each of modified examples of Embodiment 1 will be described below. In the description of the modified examples, differences from the aspects described in FIG. 1 to FIG. 9 will be mainly described, and detailed descriptions about similar points will be omitted.

Modified Example 1 of Embodiment 1

Figure 10:
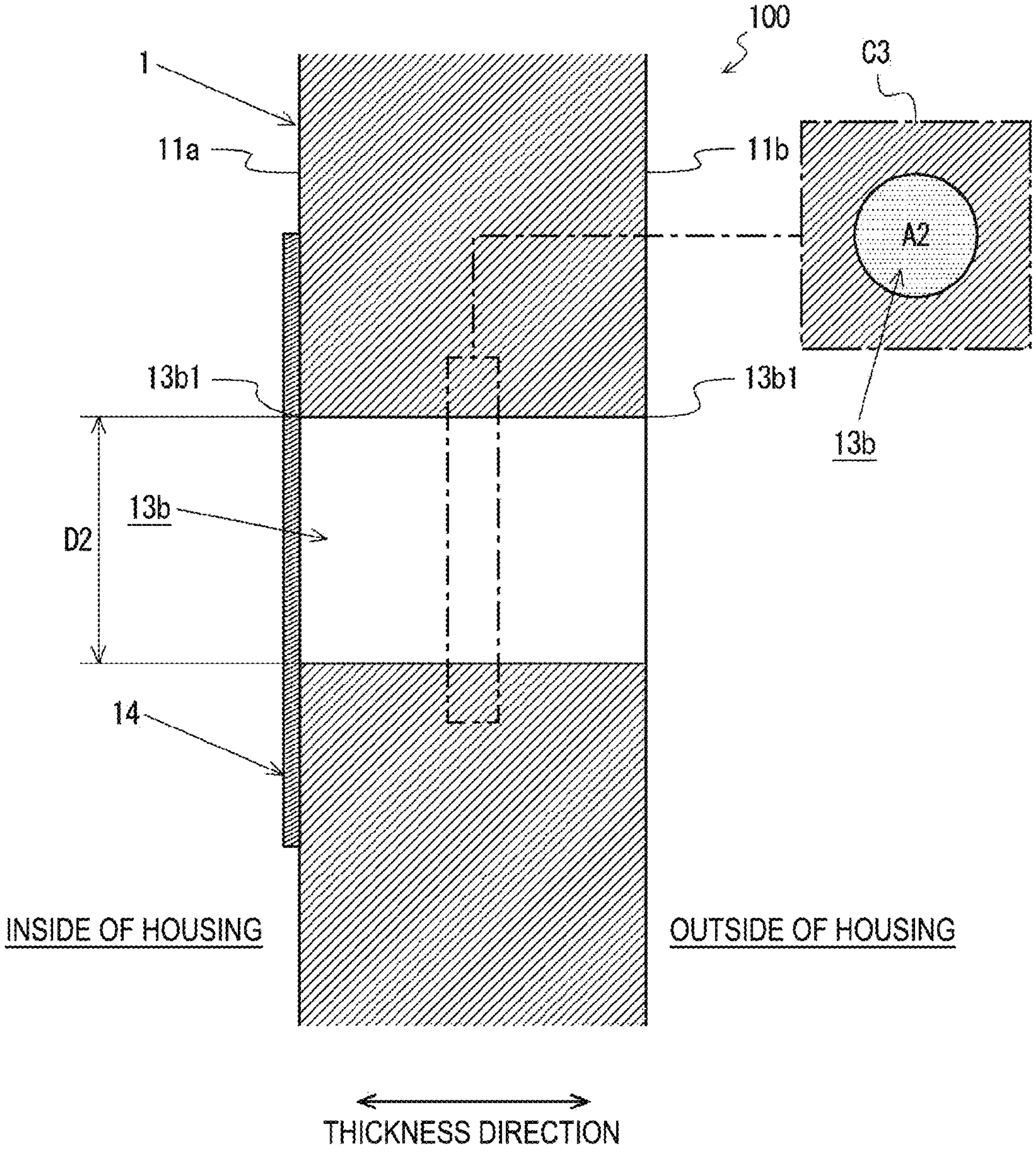
FIG. 10 is an enlarged cross-sectional view for describing a shape of the second small port according to Modified Example 1 of Embodiment 1.

FIG. 10 is an enlarged cross-sectional view for describing a shape of the second small port 13*b* according to Modified Example 1 of Embodiment 1. FIG. 10 illustrates a cross section corresponding to FIG. 5. Additionally, a cross-sectional view C3 in FIG. 10 indicates a cross section of the second small port 13*b* orthogonal to the thickness direction of the housing 1.

The second small port 13*b* according to Modified Example 1 is formed as a port having a circular cross section. The second small port 13*b* according to Modified Example 1 is different from the second small port 13*b* illustrated in FIG. 5 in that a cross section is constant from the opening 13*b*1 on the inner surface 11*a* side of the housing 1 to the opening 13*b*2 on the outer surface 11*b* side. That is, the second small port 13*b* according to Modified Example 1 does not include the tapered portion 132 as illustrated in FIG. 5. Therefore, the cross-sectional area of the gas flow path formed by the second small port 13*b* according to Modified Example 1 is constant at the minimum flow path cross-sectional area A2 in the thickness direction of the housing 1.

In Modified Example 1, the first small port 13*a* illustrated in FIG. 3 and the second small port 13*b* illustrated in FIG. 10 are combined and thus the minimum flow path cross-sectional areas (A1, A2) are equivalent to each other. By doing so, the diameter D1 of the opening 13*a*1 of the first small port 13*a* on the inner surface 11*a* side is larger than the diameter D2 of the opening 13*b*1 of the second small port 13*b* on the inner surface 11*a* side. As a result, since the peripheral length P1 of the opening 13*a*1 of the first small port 13*a* is longer than the peripheral length P2 of the opening 13*b*1 of the second small port 13*b*, the rupturing pressure at the first small port 13*a* is lower than the rupturing pressure at the second small port 13*b*. As described above, also in the gas generator 100 according to Modified Example 1, the minimum flow path cross-sectional areas of the first small port 13*a* and the second small port 13*b* are equivalent to each other, and the rupturing pressures thereat of the closing member are different from each other.

Modified Example 2 of Embodiment 1

Figure 11:
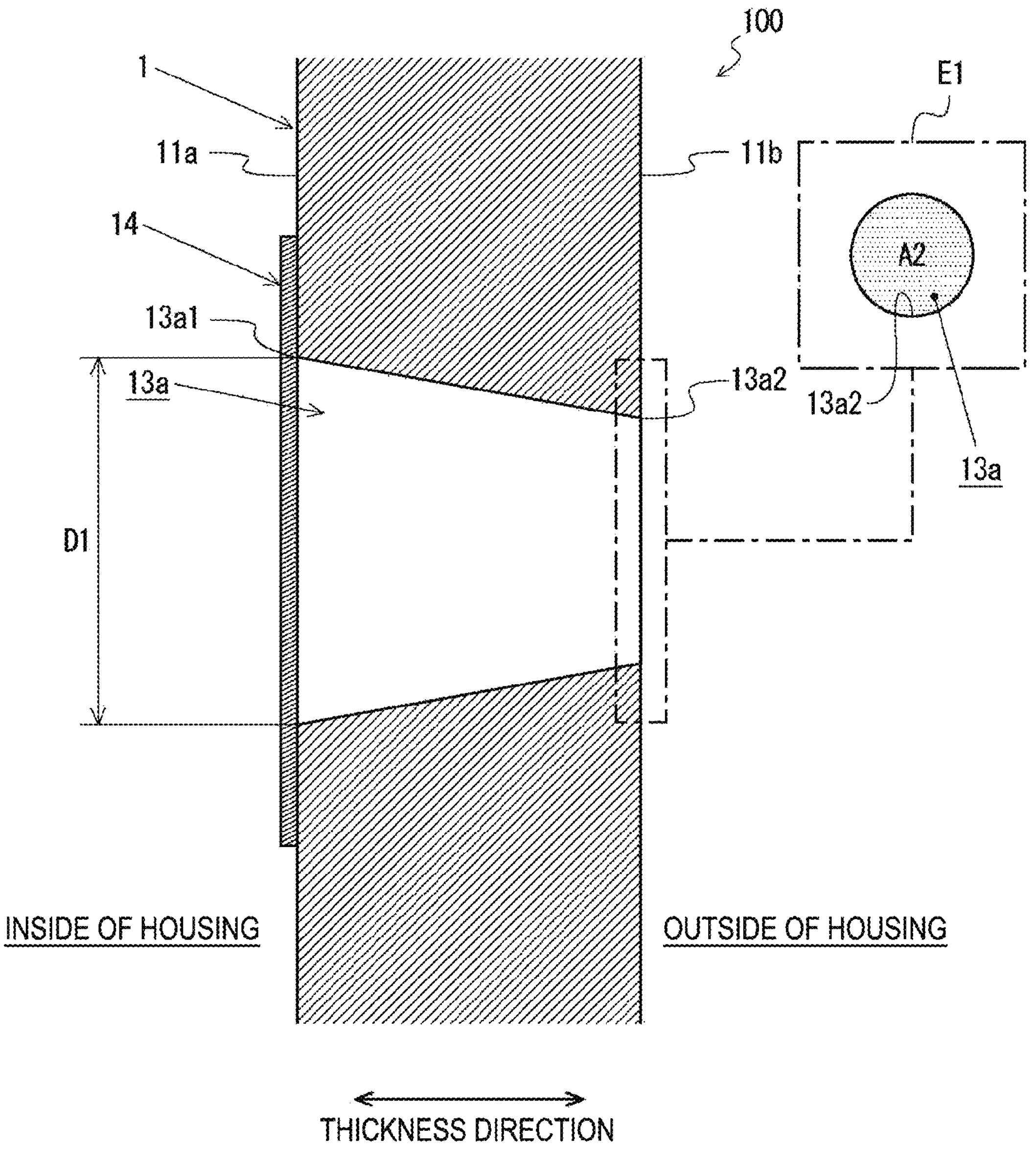
FIG. 11 is an enlarged cross-sectional view for describing a shape of the first small port according to Modified Example 2 of Embodiment 1.
Figure 12:
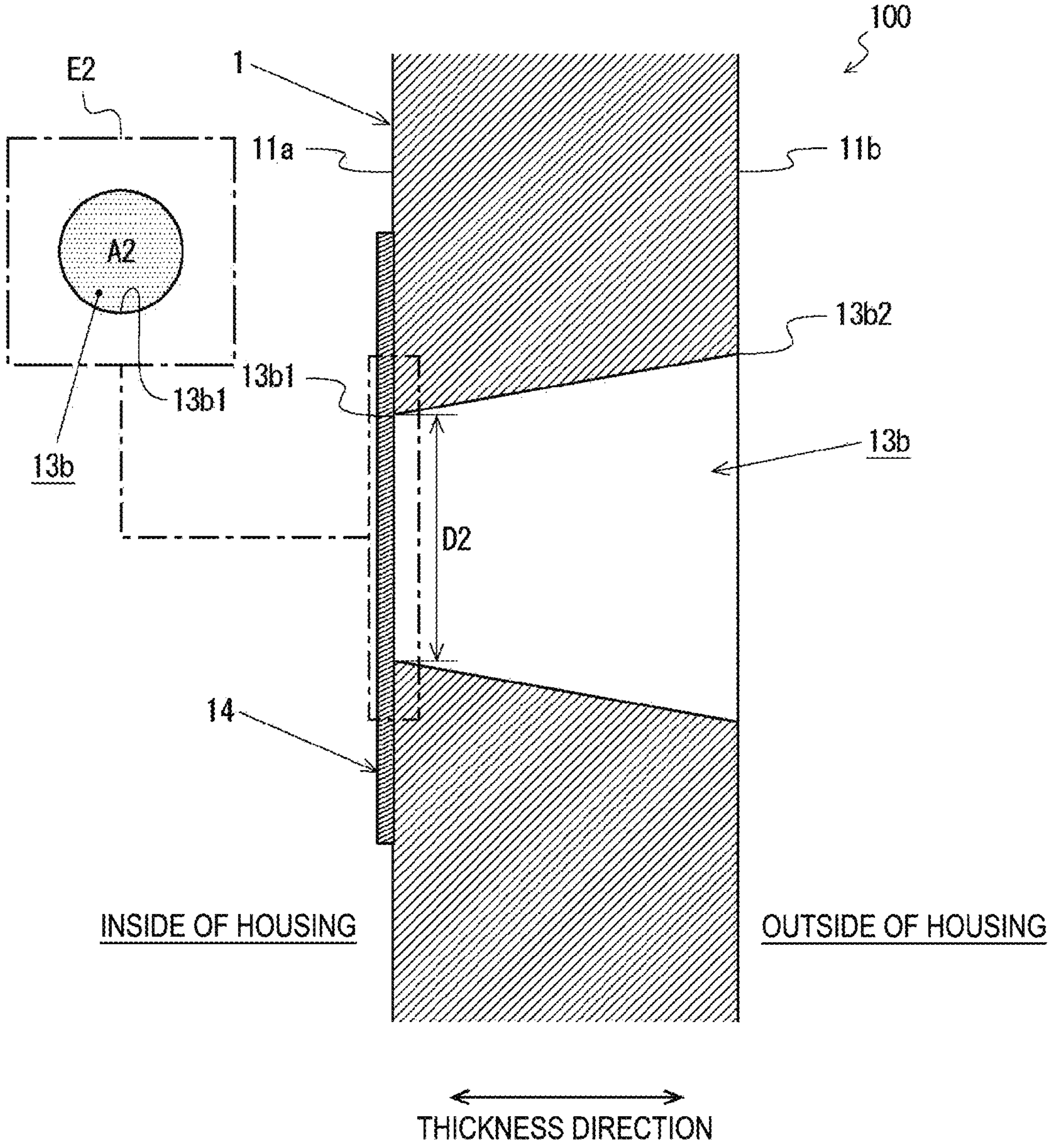
FIG. 12 is an enlarged cross-sectional view for describing a shape of the second small port according to Modified Example 2 of Embodiment 1.

FIG. 11 is an enlarged cross-sectional view for describing a shape of the first small port 13*a* according to Modified Example 2 of Embodiment 1. FIG. 11 illustrates a cross section corresponding to FIG. 3. In addition, an end view E1 of FIG. 11 illustrates the opening 13*a*2 of the first small port 13*a* on the outer surface 11*b* side of the housing 1. FIG. 12 is an enlarged cross-sectional view for describing a shape of the second small port 13*b* according to Modified Example 2 of Embodiment 1. FIG. 12 illustrates a cross section corresponding to FIG. 5. Additionally, an end view E2 of FIG. 12 illustrates the opening 13*b*1 of the second small port 13*b* on the inner surface 11*a* side of the housing 1. The first small port 13*a* and the second small port 13*b* according to Modified Example 2 are formed as ports having circular cross sections. The first small port 13*a* according to Modified Example 2 is formed in a manner that a cross-sectional area increases from the opening 13*a*2 on the outer surface 11*b* side of the housing 1 toward the opening 13*a*1 on the inner surface 11*a* side. On the other hand, the second small port 13*b* according to Modified Example 2 is formed in a manner that a cross-sectional area increases from the opening 13*b*1 on the inner surface 11*a* side of the housing 1 toward the opening 13*b*2 on the outer surface 11*b* side. That is, the first small port 13*a* and the second small port 13*b* according to Modified Example 2 do not include the straight portion 131 as illustrated in FIG. 3 and FIG. 5, and directions of tapered shapes thereof are opposite to each other.

As illustrated in FIG. 11, the first small port 13*a* according to Modified Example 2 has the minimum flow path cross-sectional area at the opening 13*a*2 on the outer surface 11*b* side of the housing 1. Additionally, as illustrated in FIG. 12, the second small port 13*b* according to Modified Example 2 has the minimum flow path cross-sectional area at the opening 13*b*1 on the inner surface 11*a* side of the housing 1.

In Modified Example 2, the minimum flow path cross-sectional area A1 of the first small port 13*a* is equivalent to the minimum flow path cross-sectional area A2 of the second small port 13*b*. Therefore, the diameter D1 of the opening 13*a*1 of the first small port 13*a* on the inner surface 11*a* side is larger than the diameter D2 of the opening 13*b*1 of the second small port 13*b* on the inner surface 11*a* side. As a result, since the peripheral length P1 of the opening 13*a*1 of the first small port 13*a* is longer than the peripheral length P2 of the opening 13*b*1 of the second small port 13*b*, a rupturing pressure at the first small port 13*a* can be made lower than a rupturing pressure at the second small port 13*b*. As described above, also in the gas generator 100 according to Modified Example 2, the minimum flow path cross-sectional areas of the first small port 13*a* and the second small port 13*b* are equivalent to each other and the rupturing pressures thereat of the closing member are different from each other. Further, the aspects of FIG. 10 to FIG. 12 may be adopted to the large ports 12, and two types of large ports 12 having the same minimum flow path cross-sectional area but slightly different bursting pressures may be provided.

Embodiment 2

The gas generator 100 according to Embodiment 2 will be described below. Embodiment 2 corresponds to an aspect in which a shape of the opening of the first gas discharge port on the inner surface side of the housing and a shape of the opening of the second gas discharge port on the inner surface side of the housing are different from each other among aspects that can be adopted by the technique according to the present disclosure. In the description of Embodiment 2, differences from the aspects according to the Embodiment 1 described in FIG. 1 to FIG. 12 will be mainly described, and detailed descriptions about similar points will be omitted.

Figure 13:
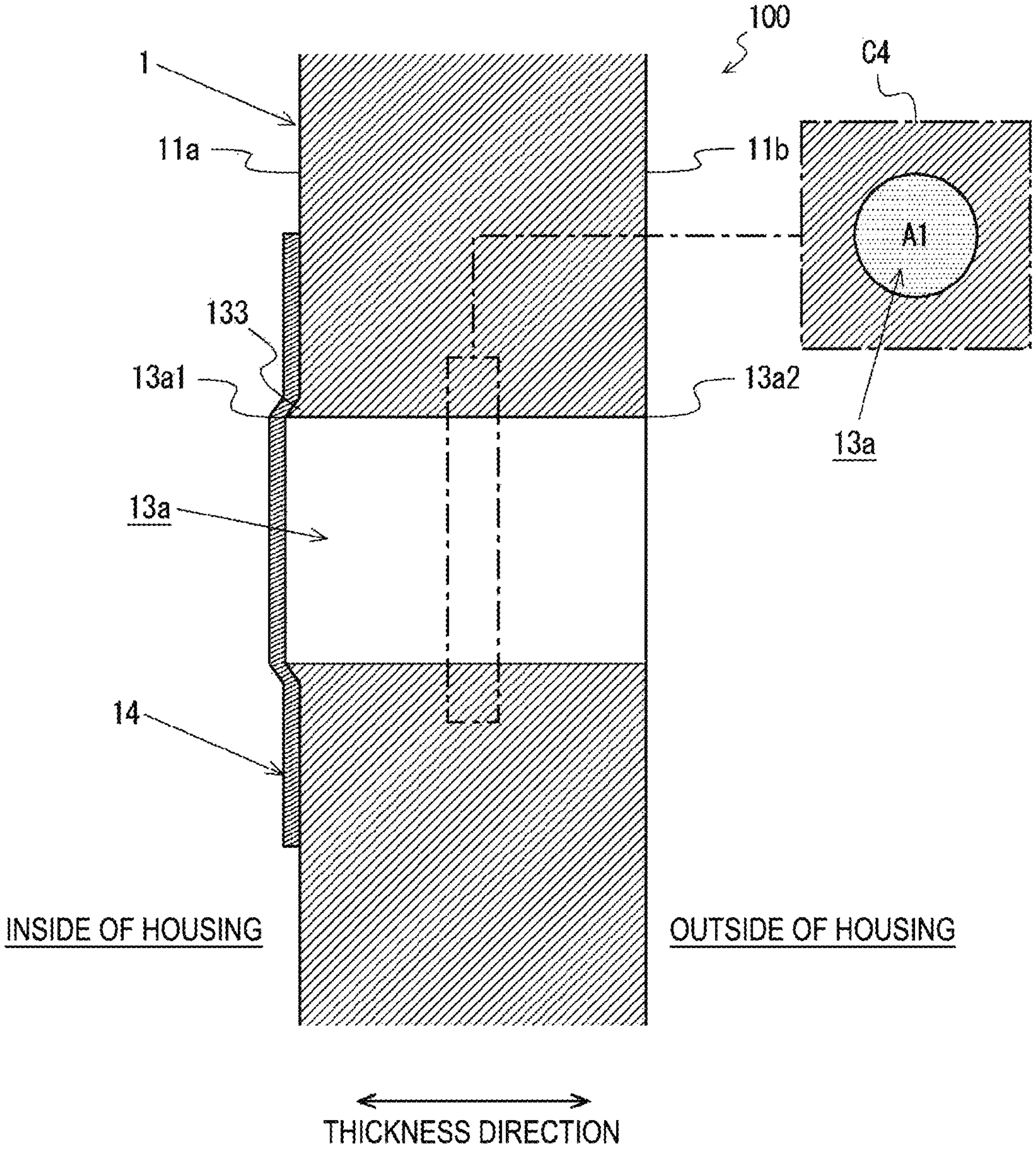
FIG. 13 is an enlarged cross-sectional view for describing a shape of the first small port according to Embodiment 2.
Figure 14:
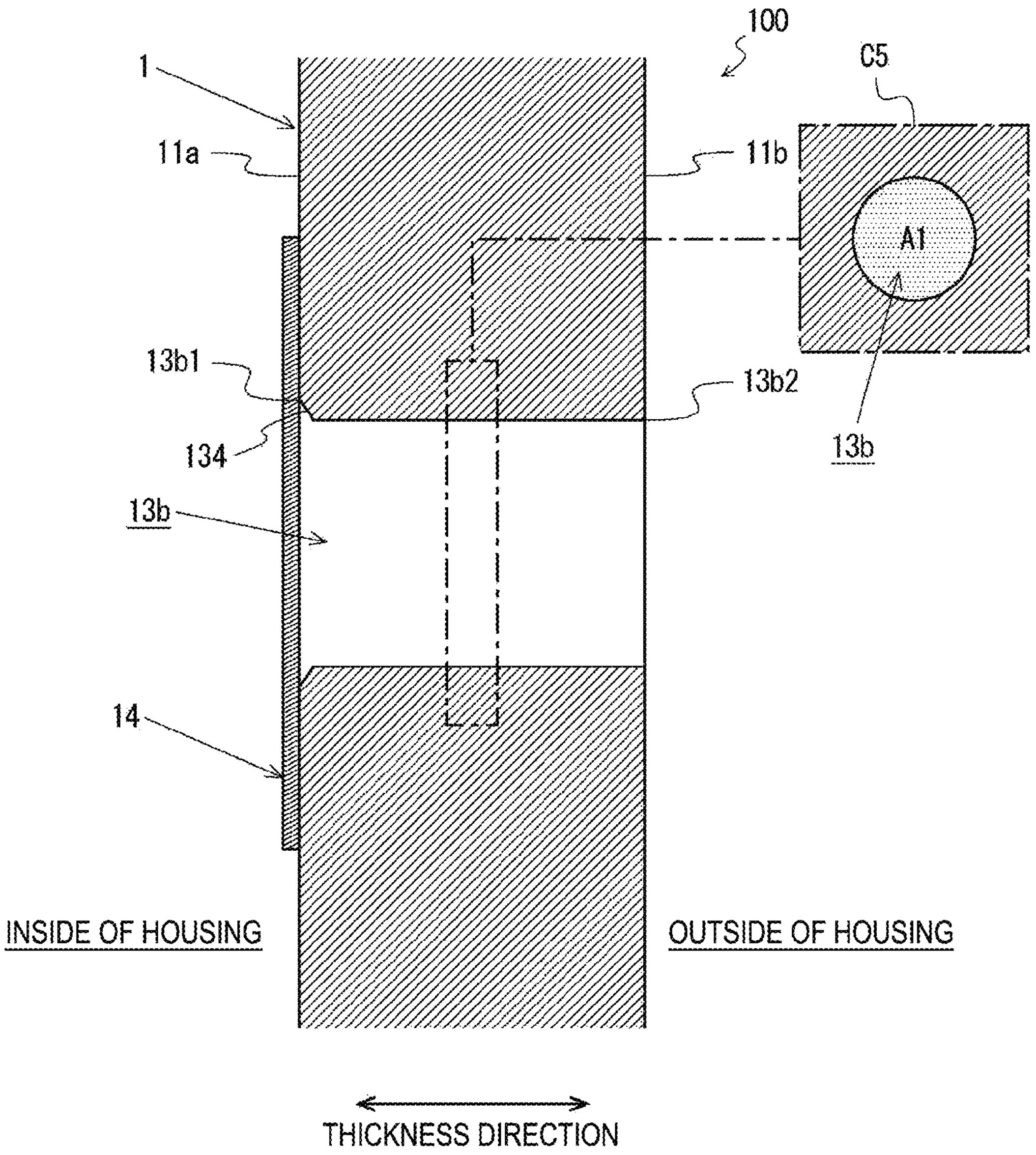
FIG. 14 is an enlarged cross-sectional view for describing a shape of the second small port according to Embodiment 2.

FIG. 13 is an enlarged cross-sectional view for describing a shape of the first small port 13*a* according to Embodiment 2. FIG. 13 illustrates a cross section corresponding to FIG. 3. Additionally, a cross-sectional view C4 in FIG. 13 indicates a cross section of the first small port 13*a* orthogonal to the thickness direction of the housing 1. FIG. 14 is an enlarged cross-sectional view for describing a shape of the second small port 13*b* according to Modified Example 2 of Embodiment 1. FIG. 14 illustrates a cross section corresponding to FIG. 5. Additionally, a cross-sectional view C5 in FIG. 14 indicates a cross section of the second small port 13*b* orthogonal to the thickness direction of the housing 1. Each of the first small port 13*a* and the second small port 13*b* according to Embodiment 2 is formed as a port having a circular cross section, and has a constant cross section from an opening on the inner surface 11*a* side of the housing 1 to an opening on the outer surface 11*b* side. In Embodiment 2, the minimum flow path cross-sectional area A1 of the first small port 13*a* is equivalent to the minimum flow path cross-sectional area A2 of the second small port 13*b*.

As illustrated in FIG. 12, a protruding portion 133 protruding to the inside of the housing 1 is formed on a peripheral edge of the opening 13*a*1 of the first small port 13*a* on the inner surface 11*a* side of the housing 1 according to Embodiment 2. The protruding portion 133 is, for example, a burr generated in processing of the first small port 13*a*. For example, in the forming of the plurality of gas discharge ports H1 in the housing 1, the first small port 13*a* is formed from the outer surface 11*b* side of the housing 1 by punching or drilling a hole, and a burr generated at the opening 13*a*1 on the inner surface 11*a* side of the housing 1 is left without being removed so that the protruding portion 133 can be formed. As illustrated in FIG. 13, the inner surface 11*a* of the housing 1 is attached with the seal tape S1, and thus the seal tape S1 covers the protruding portion 133. When the gas generating agents 110 and 120 are combusted in activation of the gas generator 100, the seal tape S1 is pressed against the peripheral edge of the opening 13*a*1 of the first small port 13*a* by a pressure of the combustion gas. At this time, since the protruding portion 133 presses the seal tape S1 in a manner to pierce the seal tape S1, the seal tape S1 is easily ruptured compared to a case where the protruding portion 133 is not formed. That is, forming the protruding portion 133 lowers the rupturing pressure of the seal tape S1 at the first small port 13*a*.

As illustrated in FIG. 14, a chamfered portion 134 is formed by chamfering, which is so-called C chamfering, on the peripheral edge of the opening 13*b*1 of the second small port 13*b* on the inner surface 11*a* side of the housing 1 according to Embodiment 2. For example, in the forming of the plurality of gas discharge ports H1 in the housing 1, the second small port 13*b* is formed from the outer surface 11*b* side of the housing 1 by punching or drilling a hole, and the opening 13*b*1 on the inner surface 11*a* side of the housing 1 is chamfered, resulting in formation of the chamfered portion 134. The chamfered portion 134 is not limited to a C-chamfered portion, and may have another shape formed by chamfering, which is so-called R chamfering. As illustrated in FIG. 13, the inner surface 11*a* of the housing 1 is attached with the seal tape S1, and thus the seal tape S1 covers the chamfered portion 134. When the gas generating agents 110 and 120 are combusted, the seal tape S1 is pressed against the peripheral edge of the opening 13*b*1 of the second small port 13*b* by a pressure of the combustion gas. However, since a corner of the peripheral edge is cut off by forming the chamfered portion 134, a shearing force is less likely to act on the seal tape S1 compared to a case where the chamfered portion 134 is not formed, and thus the seal tape S1 is more difficult to be ruptured. That is, forming the chamfered portion 134 increases the rupturing pressure of the seal tape S1 at the second small port 13*b*.

As described above, in the gas generator 100 according to Embodiment 2, in the forming of the plurality of gas discharge ports H1 in the housing 1, the shape of the opening on the inner surface 11*a* side of the housing 1 is made different between the first small port 13*a* and the second small port 13*b*. Therefore, also in the gas generator 100 according to Embodiment 2, the minimum flow path cross-sectional areas of the first small port 13*a* and the second small port 13*b* are equivalent to each other, and the rupturing pressures thereat of the seal tape S1 are different from each other. As a result, the output performance of the gas generator 100 can be stabilized.

Note that in Embodiment 2, the protruding portion 133 is formed at the first small port 13*a* and the chamfered portion 134 is formed at the second small port 13*b*, but the technique according to the embodiment of the present disclosure is not limited thereto. By forming the protruding portion on at least a part of the peripheral edge of the opening, on the inner surface side of the housing, of only either of the first gas discharge port (first small port 13*a*) or the second gas discharge port (second small port 13*b*), the rupturing pressures at the first gas discharge port and the second gas discharge port can be made different from each other. For example, either of the first gas discharge port or the second gas discharge port may be formed by punching or drilling a hole from the outer surface side of the housing, and the other may be formed by punching a hole from the inner surface side of the housing, thereby forming the protruding portion at least a part of the opening, on the inner surface side of the housing, of only the either of the first gas discharge port or the second gas discharge port. In addition, by chamfering the peripheral edge of the opening, on the inner surface side of the housing, of only either of the first gas discharge port or the second gas discharge port, the rupturing pressures at the first gas discharge port and the second gas discharge port can be made different from each other. Further, the shapes illustrated in FIG. 13 and FIG. 14 may be adopted to the large ports 12, and two types of large ports 12 having the same minimum flow path cross-sectional area but slightly different bursting pressures may be provided.

Modified Example of Second Embodiment

Figure 15A:
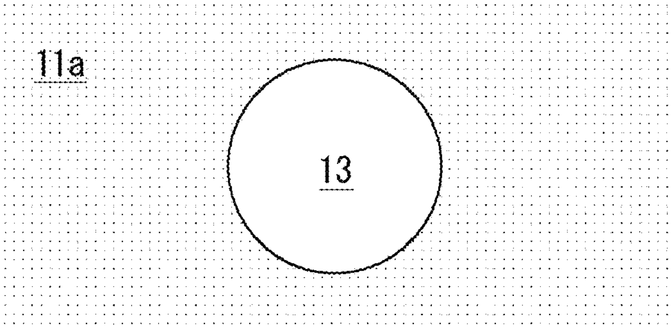
FIG. 15A is a diagram illustrating a shape example of the opening of the small port on the inner surface side of the housing.
Figure 15B:
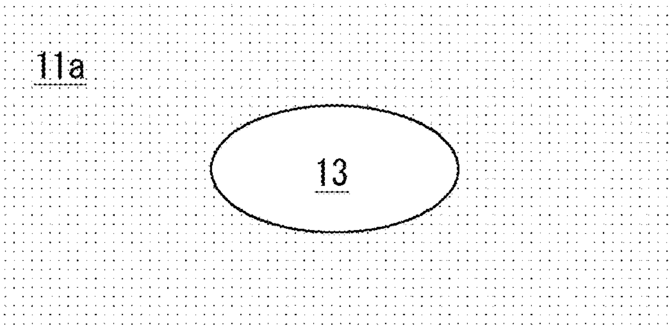
FIG. 15B is a diagram illustrating a shape example of the opening of the small port on the inner surface side of the housing.
Figure 15C:
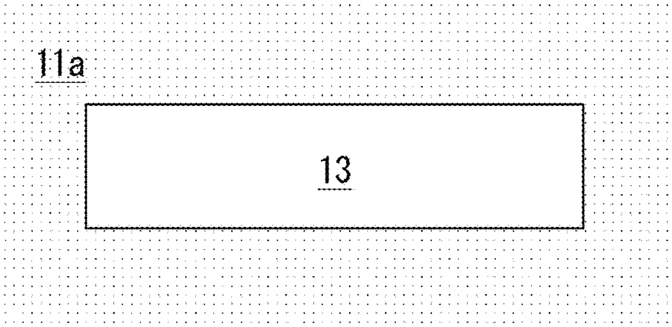
FIG. 15C is a diagram illustrating a shape example of the opening of the small port on the inner surface side of the housing.
Figure 15D:
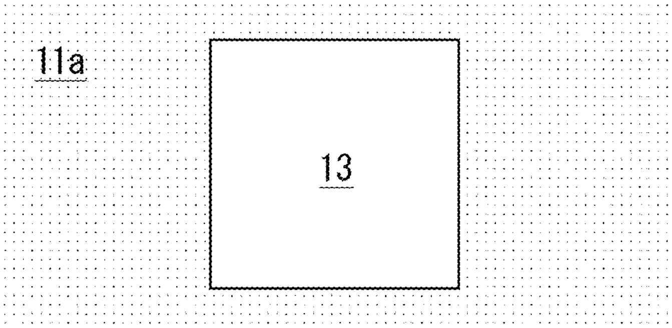
FIG. 15D is a diagram illustrating a shape example of the opening of the small port on the inner surface side of the housing.

In Embodiment 2, the planar shape of the peripheral edge of the opening on the inner surface 11*a* side of the housing 1 may be different between the first small port 13*a* and the second small port 13*b*. FIGS. 15A to 15D are diagrams illustrating an example of a shape of the opening of the small port 13 on the inner surface 11*a* side of the housing 1. FIG. 15A illustrates a case where the opening is circular, FIG. 15B illustrates a case where the opening is elliptical, FIG. 15C illustrates a case where the opening is rectangular (oblong), and FIG. 15D illustrates a case where the opening is square. Note that the shape illustrated in FIGS. 15A to 15D is merely an example. As the shape of the opening, in addition to the shapes exemplified in FIGS. 15A to 15D, various shapes such as an oval and a polygon other than a quadrangle can be adopted.

For example, the opening 13*a*1 of the first small port 13*a* and the opening 13*b*1 of the second small port 13*b* may have different shapes selected from FIGS. 15A to D. By doing so, the rupturing pressures at the first small port 13*a* and the second small port 13*b* of the seal tape S1 can be made different from each other. For example, the first small port 13*a* may be an elliptical port having a constant cross section, and the second small port 13*b* may be a circular port having a constant cross section and a flow path cross-sectional area equivalent to that of the first small port 13*a*. When compared by using equivalent areas, a peripheral length of an ellipse is longer than that of a circle. Further, for example, the first small port 13*a* may be a rectangular port having a constant cross section, and the second small port 13*b* may be a square port having a constant cross section and a flow path cross-sectional area equivalent to that of the first small port 13*a*. When compared by using equivalent areas, a peripheral length of a rectangle is longer than that of a square. In any of the above-described examples, the peripheral length P1 of the opening 13*a*1 of the first small port 13*a* is longer than the peripheral length P2 of the opening 13*b*1 of the second small port 13*b*. That is, not only the shape of the opening on the inner surface 11*a* side of the housing 1 but also the peripheral length of the opening can be made different between the first small port 13*a* and the second small port 13*b*, enabling the rupturing pressures thereat to be suitably made different from each other. Note that such a difference in shape may be adopted to the large ports 12, and two types of large ports 12 that have the same minimum flow path cross-sectional area and are configured such that bursting pressures are slightly different from each other may be provided.

Other

Suitable embodiments according to the present disclosure have been described above, but each embodiment disclosed in the present specification can be combined with each of features disclosed in the present specification. Note that in Embodiment 1, the aspect has been described in which the first gas discharge port and the second gas discharge port are different from each other in a peripheral length of the opening on the inner surface side of the housing from each other, and in Embodiment 2, the aspect has been described in which these openings have different shapes from each other. However, both of the shape and the peripheral length of the opening may be different between the first gas discharge port and the second gas discharge port. That is, in the technique according to the present disclosure, at least one of the shape or the peripheral length of the opening on the inner surface side of the housing may be different between the first gas discharge port and the second gas discharge port. Note that even when a plurality of gas discharge ports having different shapes or peripheral lengths of the openings on the inner surface side of the housing are provided, a case where a difference in shape or peripheral length is recognized to be within processing tolerance of the gas discharge ports is excluded from the technique according to the present disclosure. In addition, in the above-described embodiments, a so-called dual type gas generator including two igniters has been exemplified, but even in a case where the technique according to the present disclosure is adopted to a so-called single type gas generator including only one igniter as illustrated in FIG. 1 of JP 2019-156107 A, for example, it is possible to obtain an effect similar to that of the above-described embodiments. For example, it is assumed that a single type gas generator is provided with at least two types of gas discharge ports (the first gas discharge port and the second gas discharge port) that have the same gas discharge amount per unit time (internal pressure control function for the housing) and are configured such that rupturing pressures (ease of opening) of the closing member thereat are different from each other. Also in this case, since the open timing of the first gas discharge port and the open timing of the second gas discharge port are different from each other in activation of the gas generator, that is, since the gas discharge ports open in multiple stages, it is possible to suppress a rapid internal pressure drop in low-temperature activation, for example, and to exhibit combustion performance close to that at a normal temperature or high temperature. Note that an object of the technique according to the present disclosure is to control the internal pressure of the housing in activation of the gas generator. As long as the timings at which the first gas discharge port and the second gas discharge port open can be adjusted, application of the technique is not limited to only the case where the environmental temperature in activation is different as in the above-described embodiments.

REFERENCE SIGNS LIST

100 Gas generator
1 Housing
41 First igniter (one example of igniter)
110 First gas generating agent (one example of gas generating agent)
H1 Gas discharge port
13*a* First small port (one example of first gas discharge port)
13*b* Second small port (one example of second gas discharge port)
S1 Seal tape (one example of closing member)

The invention claimed is:

1. A gas generator comprising:
an igniter;
a gas generating agent that generates a combustion gas by being combusted in response to actuation of the igniter;
a housing accommodating the igniter and the gas generating agent inside the housing;
a plurality of gas discharge ports penetrating through the housing from an inside to an outside of the housing; and
a closing structure attached to an inner surface of the housing, the closing structure being configured to close, before the actuation of the igniter, the plurality of gas discharge ports by covering an opening of each of the plurality of gas discharge ports on an inner surface side of the housing and open the plurality of gas discharge ports by being ruptured due to reception of a pressure of the combustion gas generated by the actuation of the igniter, wherein
the plurality of gas discharge ports include at least one first gas discharge port and at least one second gas discharge port, the at least one first gas discharge port and the at least one second gas discharge port being configured such that rupturing pressures of the closing structure at the at least one first gas discharge port and the at least one second gas discharge port are different from each other,
a minimum flow path cross-sectional area of a gas flow path formed by the at least one first gas discharge port is equivalent to a minimum flow path cross-sectional area of a gas flow path formed by the at least one second gas discharge port, and
the at least one first gas discharge port and the at least one second gas discharge port are different from each other in at least one of a shape or a peripheral length of the opening on the inner surface side of the housing.

2. The gas generator according to claim 1, wherein the closing structure comprises a plurality of closing structures, and
the at least one first gas discharge port and the at least one second gas discharge port are closed with the closing structures having specifications identical to each other.

3. The gas generator according to claim 1, wherein
each of the at least one first gas discharge port and the at least one second gas discharge port is a port having a circular cross section, and
the at least one first gas discharge port and the at least one second gas discharge port are different from each other in a port diameter of the opening on the inner surface side of the housing.

4. The gas generator according to claim 1, wherein
each of the at least one first gas discharge port and the at least one second gas discharge port includes:
a straight portion having a constant cross section in a thickness direction of the housing, and
a tapered portion continuous with the straight portion and having a cross-sectional area increasing with distance from the straight portion in the thickness direction,
in one of the at least one first gas discharge port and the at least one second gas discharge port, the tapered portion opens on the inner surface side of the housing and the straight portion opens on an outer surface side of the housing, and
in the other of the at least one first gas discharge port and the at least one second gas discharge port, the straight portion opens on the inner surface side of the housing, and the tapered portion opens on the outer surface side of the housing.

5. The gas generator according to claim 4, wherein
the straight portion is constituted by a shear surface, and the tapered portion is constituted by a fracture surface.

6. The gas generator according to claim 4, wherein
a relationship of $0.3<t2/t1<0.7$ is satisfied,
where a thickness of the housing is denoted by t1, and a length of the straight portion in the thickness direction of the housing is denoted by t2.

7. The gas generator according to claim 1, wherein
a protruding portion protruding toward the inner surface side of the housing is formed at at least a part of a peripheral edge of the opening on the inner surface side of the housing of only one of the at least one first gas discharge port and the at least one second gas discharge port, and
the closing structure is attached to the inner surface of the housing while covering the protruding portion.

8. The gas generator according to claim 1, wherein
a peripheral edge of the opening on the inner surface side of the housing of only one of the at least one first gas discharge port and the at least one second gas discharge port is chamfered.

9. A method for producing a gas generator,
the gas generator including:
an igniter,
a gas generating agent that generates a combustion gas by being combusted in response to actuation of the igniter,
a housing accommodating the igniter and the gas generating agent inside the housing,
a plurality of gas discharge ports penetrating through the housing from an inside to an outside of the housing, and
a closing structure to close the plurality of gas discharge ports, the method comprising:
forming the plurality of gas discharge ports including at least one first gas discharge port and at least one second gas discharge port in the housing in such a manner that rupturing pressures of the closing structure at the at least one first gas discharge port and the at least one second gas discharge port are different from each other; and
attaching the closing structure to an inner surface of the housing in such a manner that the closing structure covers an opening of each of the plurality of gas discharge ports on an inner surface side of the housing, wherein
in the forming of the plurality of gas discharge ports in the housing, a minimum flow path cross-sectional area of a gas flow path formed by the at least one first gas discharge port and a minimum flow path cross-sectional area of a gas flow path formed by the at least one second gas discharge port are equivalent to each other, and the at least one first gas discharge port and the at least one second gas discharge port are different from each other in at least one of a shape or a peripheral length of the opening on the inner surface side of the housing.

10. The method for producing a gas generator according to claim 9, wherein in the forming of the plurality of gas discharge ports in the housing, one of the at least one first gas discharge port and the at least one second gas discharge port is formed by punching a hole from an outer surface side of the housing, and the other of the at least one first gas discharge port and the at least one second gas discharge port is formed by punching a hole from the inner surface side of the housing.

11. The method for producing a gas generator according to claim 9, wherein in the forming of the plurality of gas discharge ports in the housing, chamfering is performed on the opening on the inner surface side of the housing of only one of the at least one first gas discharge port and the at least one second gas discharge port.

12. The method for producing a gas generator according to claim 9, wherein in the attaching of the closing structure to the inner surface of the housing, the closing structure comprises a plurality of closing structures, and the at least one first gas discharge port and the at least one second gas discharge port are closed with the closing structures having specifications identical to each other.

13. A gas generator, comprising:

a housing accommodating a igniter and a gas generating agent inside thereof;

a first gas discharge port penetrating through the housing from an inside to an outside of the housing, and being closed, from the inside of the housing, by a first closing structure provided with a first rupturable pressure, the first gas discharge port including a first minimum flow path cross-sectional area;

a second gas discharge port penetrating through the housing from the inside to the outside of the housing, and being closed, from the inside of the housing, by a second closing structure provided with a second rupturable pressure different from the first rupturable pressure, the second gas discharge port including a second minimum flow path cross-sectional area equivalent to the first minimum flow path cross-sectional area, the first gas discharge port and the second gas discharge port being different from each other in at least one of a shape or a peripheral length of an opening on a side of an inner surface of the housing.

14. The gas generator according to claim 13, wherein the first closing structure and the second closing structure have specifications identical to each other.

15. The gas generator according to claim 13, wherein the first gas discharge port and the second gas discharge port have a circular cross section, and the first gas discharge port and the second gas discharge port are different from each other in a diameter of the opening on the side of the inner surface of the housing.

16. The gas generator according to claim 13, wherein each of the first gas discharge port and the second gas discharge port includes:

a straight portion having a constant cross section in a thickness direction of the housing, and a tapered portion continuous with the straight portion and having a cross-sectional area increasing with distance from the straight portion in the thickness direction, one of the first gas discharge port and the second gas discharge port is provided with the tapered portion on the side of the inner surface of the housing and the straight portion on a side of an outer surface of the housing, and the other of the first gas discharge port and the second gas discharge port is provided with the straight portion on the side of the inner surface of the housing, and the tapered portion on the side of the outer surface of the housing.

17. The gas generator according to claim 16, wherein the straight portion is constituted by a shear surface, and the tapered portion is constituted by a fracture surface.

18. The gas generator according to claim 13, wherein a protruding portion protruding toward the inside of the housing is formed at a part of a peripheral edge of the opening on the side of the inner surface of the housing of only one of the first gas discharge port and the second gas discharge port, and one of the first closing structure and the second closing structure is attached to the inner surface of the housing while covering the protruding portion.

19. The gas generator according to claim 13, wherein a peripheral edge of the opening on the side of the inner surface of the housing of only one of the first gas discharge port and the second gas discharge port is chamfered.

* * * * *